(12) United States Patent
Pudipeddi et al.

(10) Patent No.: US 8,321,439 B2
(45) Date of Patent: Nov. 27, 2012

(54) QUICK FILENAME LOOKUP USING NAME HASH

(75) Inventors: Ravisankar V. Pudipeddi, Bellevue, WA (US); Vishal V. Ghotge, Seattle, WA (US); Ravinder S. Thind, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 12/389,396

(22) Filed: Feb. 20, 2009

(65) Prior Publication Data

US 2009/0164440 A1    Jun. 25, 2009

Related U.S. Application Data

(63) Continuation-in-part of application No. 11/229,485, filed on Sep. 16, 2005.

(60) Provisional application No. 61/030,043, filed on Feb. 20, 2008, provisional application No. 60/637,407, filed on Dec. 17, 2004.

(51) Int. Cl.
G06F 7/00 (2006.01)
G06F 17/30 (2006.01)

(52) U.S. Cl. .................................................. 707/758

(58) Field of Classification Search .................. 707/758, 707/999.006
See application file for complete search history.

(56) References Cited

U.S. PATENT DOCUMENTS

| | | | |
|---|---|---|---|
| 4,780,821 A | 10/1988 | Crossley | |
| 4,987,531 A | 1/1991 | Nishikado et al. | |
| 5,083,264 A | 1/1992 | Platteter et al. | |
| 5,202,982 A | 4/1993 | Gramlich et al. | |
| 5,307,494 A | 4/1994 | Yasumatsu et al. | |
| 5,313,646 A | 5/1994 | Hendricks et al. | |
| 5,359,725 A | 10/1994 | Garcia et al. | |
| 5,363,487 A | 11/1994 | Willman et al. | |
| 5,367,671 A | 11/1994 | Feigenbaum et al. | |
| 5,371,885 A | 12/1994 | Letwin | |
| 5,388,257 A | 2/1995 | Bauer | |
| 5,392,427 A | 2/1995 | Barrett et al. | |
| 5,412,808 A | 5/1995 | Bauer | |
| 5,421,001 A | 5/1995 | Methe | |
| 5,434,974 A | 7/1995 | Loucks et al. | |
| 5,437,029 A | 7/1995 | Sinha | |

(Continued)

FOREIGN PATENT DOCUMENTS

EP     0462587 A2   12/1991

(Continued)

OTHER PUBLICATIONS

Australian Patent Application No. 2005229678: Rejection dated May 17, 2010, 1 page.

(Continued)

*Primary Examiner* — Kimberly Wilson
(74) *Attorney, Agent, or Firm* — Woodcock Washburn LLP

(57) ABSTRACT

File system methods and systems enabling efficient detection that a filename exists, by executing a hash function on the file name to reduce the overall computational complexity of determining that a directory entry might match the target filename, prior to performing the string comparison to determine the entry does match the target filename. A cross-device extensible means of providing a conversion function, such as uppercasing the filename, occurs prior to the hash. Methods of creating, deleting, and modifying the directory entries is further provided, as well as details of an embodiment of the file system described.

18 Claims, 8 Drawing Sheets

U.S. PATENT DOCUMENTS

| | | | |
|---|---|---|---|
| 5,483,652 | A | 1/1996 | Sudama et al. |
| 5,535,375 | A | 7/1996 | Eshel et al. |
| 5,579,517 | A | 11/1996 | Reynolds et al. |
| 5,596,755 | A | 1/1997 | Pletcher et al. |
| 5,627,996 | A | 5/1997 | Bauer |
| 5,694,606 | A | 12/1997 | Pletcher et al. |
| 5,745,752 | A | 4/1998 | Hurvig et al. |
| 5,745,902 | A | 4/1998 | Miller et al. |
| 5,754,848 | A | 5/1998 | Hanes |
| 5,758,352 | A | 5/1998 | Reynolds et al. |
| 5,761,675 | A | 6/1998 | Isenberg |
| 5,761,677 | A | 6/1998 | Senator et al. |
| 5,765,169 | A | 6/1998 | Conner |
| 5,819,275 | A | 10/1998 | Badger et al. |
| 5,898,868 | A | 4/1999 | Krueger et al. |
| 5,923,884 | A | 7/1999 | Peyret et al. |
| 5,926,805 | A | 7/1999 | Hurvig et al. |
| 5,930,828 | A | 7/1999 | Jensen et al. |
| 6,055,527 | A | 4/2000 | Badger et al. |
| 6,081,804 | A * | 6/2000 | Smith .................... 707/696 |
| 6,144,969 | A | 11/2000 | Inokuchi et al. |
| 6,205,558 | B1 | 3/2001 | Sobel |
| 6,374,265 | B1 | 4/2002 | Chen et al. |
| 6,615,365 | B1 | 9/2003 | Jenevein et al. |
| 7,072,917 | B2 | 7/2006 | Wong et al. |
| 7,274,857 | B2 | 9/2007 | Nallur et al. |
| 7,380,140 | B1 | 5/2008 | Weissman et al. |
| 7,383,288 | B2 | 6/2008 | Miloushev et al. |
| 7,620,620 | B1 | 11/2009 | Sedlar |
| 7,676,491 | B2 | 3/2010 | Jansen et al. |
| 7,747,664 | B2 | 6/2010 | Patel et al. |
| 7,757,100 | B2 | 7/2010 | Weissman et al. |
| 7,873,596 | B2 | 1/2011 | Pudipeddi et al. |
| 7,941,435 | B2 * | 5/2011 | Kao et al. .................... 707/747 |
| 7,979,409 | B2 | 7/2011 | Kime |
| 2002/0062301 | A1 | 5/2002 | Rudoff et al. |
| 2003/0088587 | A1 | 5/2003 | Merrells |
| 2003/0135650 | A1 | 7/2003 | Kano et al. |
| 2003/0182330 | A1 | 9/2003 | Manley et al. |
| 2003/0221095 | A1 | 11/2003 | Gaunt et al. |
| 2004/0064483 | A1 * | 4/2004 | Bulka et al. .................... 707/200 |
| 2004/0215600 | A1 | 10/2004 | Aridor |
| 2005/0015354 | A1 | 1/2005 | Grubbs |
| 2005/0172005 | A1 | 8/2005 | Goodwin |
| 2006/0136529 | A1 | 6/2006 | Pudipeddi et al. |
| 2006/0224578 | A1 * | 10/2006 | Kadatch et al. .................... 707/5 |
| 2008/0091702 | A1 | 4/2008 | Pudipeddi et al. |
| 2008/0168029 | A1 | 7/2008 | Pudipeddi et al. |
| 2008/0172426 | A1 | 7/2008 | Patel et al. |
| 2008/0215646 | A1 | 9/2008 | Pudipeddi et al. |
| 2008/0215647 | A1 | 9/2008 | Pudipeddi et al. |
| 2009/0164440 | A1 | 6/2009 | Pudipeddi et al. |
| 2009/0164539 | A1 | 6/2009 | Pudipeddi et al. |
| 2009/0265400 | A1 | 10/2009 | Pudipeddi et al. |

FOREIGN PATENT DOCUMENTS

| | | |
|---|---|---|
| EP | 0618540 A2 | 10/1994 |
| EP | 1677214 | 7/2006 |
| JP | 64041039 | 2/1989 |
| JP | 01315843 | 12/1989 |
| JP | 02148341 | 6/1990 |
| JP | 03017753 | 1/1991 |
| JP | 04188239 | 7/1992 |
| JP | 6019763 | 1/1994 |
| JP | 07-234879 A | 9/1995 |
| JP | 2001-160068 A | 6/2001 |
| JP | 2001325134 | 11/2001 |
| JP | 2004288007 | 10/2004 |
| RU | 2159467 | 11/2000 |

OTHER PUBLICATIONS

Chile Patent Application No. 2936-05: Rejection dated Nov. 11, 2005, 6 pages.

China Patent Application No. 200510125054.1: Rejection dated Jul. 4, 2008, 8 pages.

China Patent Office Application No. 200510125054.1: Rejection dated Jan. 15, 2010, 9 pages.

EP Patent Application No. 05111554.1: Rejection dated Jun. 24, 2009, 4 pages.

Israel Patent Application No. 172014: Rejection dated Dec. 17, 2009, 2 pages.

Karpovich et al., "Extensible File System (ELFS): An Object-Oriented Approach to High Performance File I/O", OOPSLA 1994-Proceedings of the Ninth Annual Conference on Object-Oriented Programming Systems, Language and Applications, ACM SIGPLAN Notices, Oct. 1994, 29(10), 191-204.

Mexican Patent Application No. PA/a/2005/012405: Rejection dated Mar. 10, 2010, 4 pages.

Mexican Patent Application No. PA/a/2005/012405: Rejection dated May 6, 2009, 2 pages.

Russian Patent Application No. 2005134810/09: Rejection dated Sep. 11, 2005, 5 pages.

Khalidi et al., "Extensible File System in Spring", Sun Microsystems Laboratories, Inc., Sep. 1993, 1-18.

Tanenbaum, A.S., "Modern Operating Systems", 2nd ed., Prentice Hall, Englewood Cliffs, NJ, 2001, pp. 442-445, 830-834, 835-839.

"Above Software Introduces 'Golden Retriever 2.0b," News Release, Dateline: Irvine, California, Mar. 29, 1993.

Bonner, P., "What's in a Name?" PC/Computing 2(9):169(2), Sep. 1989.

Bonner, P., "Build a Document Manager under Windows," PC/Computing 4(2):275(7), Dec. 1991.

Duncan, R., "Design Goals and Implementation of the New High Performance File System," Microsoft Systems Journal 4(5):1-13, Sep. 1989.

Duncan, R., "Power Programming Using Long Filenames and Extended Attributes, Part I," PC Magazine 9(8):317-322, Apr. 24, 1990.

Duncan, R., "Power Programming Using Long Filenames and Extended Attributes, Part II,"PC Magazine 9(9):305-310, May 15, 1990.

"File Sharing Protocol," Microsoft Corporation, Nov. 7, 1988.

Glass, B., "Create Your Own Environment," PC-Computing 3(10):106-110, Oct. 1990.

Hurwicz, M., "MS-DOS 3.1 Makes It Easy to Use IBM PCs on a Network," Data Communications, Nov. 1985, pp. 223-237.

Leffler, S.J., et al., "The Design and Implementation of the 4.3BSD UNIX Operating System," Addison-Wesley Publishing Company, New York, 1989, Chap.2, "Design Overview of 4.3BSD," pp. 34-36.

"Long Filenames,"Article 15, pp. 19-47, date unknown.

Mallory, J., "Breakthrough on DOS Filename Limits," Newsbytes News Network, Apr. 12, 1993, << http://calbears.findarticles.com/p/articles/mi_mONEW/is_1993_April_12/ai_13786607/print> [retrieved May 24, 2006].

McCormick, J., "Presentation Manager Under OS/2 Encourages Lengthy Name-Calling," Government Computer News 9(1):16, 18, May 14, 1990.

Lent, A.F. and S. Miastkowski, "New, Improved Windows,"PC World 11(12):252(17), Dec. 1993.

O'Malley, C., "Fetching Desktop Files: Standalone Document Managers," Windows Sources 1(2):443-444, Mar. 1993.

Rohan, R., "Golden Retriever Fetches Files in Windows," Computer Shopper 12(11):947, Nov. 1992.

Tanenbaum, A.S. (ed), MINIX Operating System, Keiichiro Sakamoto, Tokyo, Japan, 1989, Chap. 5, "File System," pp. 310-313 (English translation of Japanese publication).

Trivette, D.B., "Utility Provides 60-Character Filenames," PC Magazine 7(16):56, Sep. 27, 1988.

Wang, Y.E.G., "Universal_File_Names for Ada," Ada Letters 10(1):111-117, Jan./Feb. 1990.

"World Software Corporation (WSC) Launches Extend-a-name in Europe," Computer Product Update, Jul. 27, 1990.

"The Intelligent Way to Search", News Release, Dateline: Burlington, Massachusetts, Oct. 1987.

\* cited by examiner

| NAME | SIZE | |
|---|---|---|
| OEM NAME | 3 | ~ 400 |
| | | ~ 402 |
| DATA SIZE DESCRIPTORS | X | ~ 404 |
| ACTIVE FAT | 2 | ~ 406 |
| VOLUME SERIAL NUMBER | 4 | ~ 408 |
| FILE SYSTEM TYPE | X | ~ 410 |

*Fig.4.*

| NAME | SIZE | |
|---|---|---|
| IN USE | 1:1 | ~ 500 |
| | | ~ 502 |
| TYPE | 1:7 | ~ 504 |
| SECONDARY ENTRIES | 1 | ~ 506 |
| ATTRIBUTES | 2 | ~ 508 |
| TIME | X | ~ 510 |
| TIME ZONE | 1 | ~ 512 |

*Fig.5.*

| NAME | SIZE | |
|---|---|---|
| IN USE | 1:1 | 602 |
| TYPE | 1:7 | 604 |
| CHARACTERS | 1 | 606 |
| NAME HASH | 2 | 608 |
| FILE NAME | 28 | 610 |

(600 points to the header row)

*Fig.6.*

| NAME | SIZE | |
|---|---|---|
| IN USE | 1:1 | 702 |
| TYPE | 1:7 | 704 |
| SECONDARY ENTRIES | 1 | 706 |
| GUID | 16 | 708 |

(700 points to the header row)

*Fig.7.*

| NAME | SIZE | |
|---|---|---|
| IN USE | 1:1 | 802 |
| TYPE | 1:7 | 804 |
| SECONDARY ENTRIES | 1 | 806 |
| GUID | 16 | 808 |
| OTHER | X | 810 |

| NAME | SIZE | |
|---|---|---|
| IN USE | 1:1 | 902 |
| TYPE | 1:7 | 904 |
| GUID | 16 | 908 |
| OTHER | X | 910 |

| NAME | SIZE | |
|---|---|---|
| IN USE | 1:1 | 1002 |
| TYPE | 1:7 | 1004 |
| ACL INFORMATION | X | 1006 |

QUICK FILENAME LOOKUP USING NAME HASH

CROSS-REFERENCE TO RELATED APPLICATIONS

This application claims the benefit of U.S. Provisional Application No. 61/030,043, entitled FILE ALLOCATION TABLE, filed on Feb. 20, 2008;

This application is a Continuation-in-Part of U.S. Non-Provisional application Ser. No. 11/229,485, entitled EXTENSIBLE FILE SYSTEM, filed on Sep. 16, 2005, which claims the benefit of U.S. Provisional Application No. 60/637,407, entitled FILE SYSTEM FORMAT FOR PORTABLE MEDIA, and filed on Dec. 17, 2004;

The contents of U.S. application Ser. No. 11/229,485, U.S. Provisional Application No. 60/637,407, and U.S. Provisional Application No. 61/030,043 are incorporated by reference herein in their entirety.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they may provide inadequate flexibility for increasing storage size capacities and/or storage media applications.

SUMMARY

An extensible file system format for portable storage media is provided. The extensible file system format includes the specification of primary and secondary directory entry types that may be custom defined. The primary and secondary directory entry types can be further classified as critical and benign directory entries.

In some embodiments, a computer-readable medium having computer-executable components for storing data is provided. The computer-readable components can include specific structures for improving the efficiency of determining if a target file name exists. In some embodiments, determining if the target file name exists includes (1) determining a file name hash, (2) finding a directory entry set containing the same hash and a potentially matching filename, thus either reducing the set of possible directory entries or more quickly removing a directory entry from consideration, and (3) determining the target file name exists by matching its file name against the potentially matching filename. In some embodiments, target file name may be converted to an uppercase version of the filename, e.g. for operating systems which perform case-insensitive operations on files. In some embodiments, conversion to uppercase may be based on an Up-Case Table stored on the media. In some embodiments, the directory entry can be read from one or more computer readable storage media, and the file name hash is compared to the directory entry set name hash value. In some embodiments, determining the file name hash can include using a set of pre-calculated hash values for at least a portion of the target file name. For example, if the device only creates 1000 file names, it can lookup the corresponding file name hash from a pre-computed corresponding set of values instead of performing the calculation. In some embodiments, if the a portion of the file names commonly created by the device are the same (e.g., all files start with "IMG" followed by a four digit number), a portion of the hash can be precomputed (e.g., "IMG0", "IMG1", "IMG2", "IMG", etc.) to further reduce computation of the hash value. As would be appreciated, the above processes can enable determination if a file name exists by allowing a comparison of fixed-length file hashes prior to comparisons of variable-length strings.

In some embodiments, a directory entry set on one or more computer-readable storage media is updated to contain information corresponding to a file. The directory entry set can be comprised of at least three contiguous DirectoryEntry data structures, the first of which can be a File DirectoryEntry data structure, the second can be a Stream Extension DirectoryEntry data structure, and the third can be a first File Name Extension DirectoryEntry data structure of a one or more contiguous File Name Extension DirectoryEntry data structures, the Stream Extension DirectoryEntry data structure can include a name hash field and a name length field, and the name length field can indicate the number of characters in the file name stored in the one or more contiguous File Name Extension DirectoryEntry data structures. In some embodiments, the DirectoryEntry data structures are all of the same fixed length, to further improve computational efficiencies.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages embodied herein will become more readily appreciated as the same become better understood by reference to the following detailed description, when taken in conjunction with the accompanying drawings, wherein:

FIG. 4 is a block diagram illustrative of data components for implementing a boot process block in an extensible file system format in accordance with an embodiment of the invention.

FIG. 5 is a block diagram illustrative of data components for implementing directory entries in an extensible file system format in accordance with an embodiment of the invention.

FIG. 6 is a block diagram illustrative of data components for implementing a file name and extensions in an extensible file system format in accordance with an embodiment of the invention.

FIG. 7 is a block diagram illustrative of data components for implementing a volume identifier in an extensible file system format in accordance with an embodiment of the invention.

FIG. 8 is a block diagram illustrative of data components for implementing an extensible directory entry in an extensible file system format in accordance with an embodiment of the invention.

FIG. 9 is a block diagram illustrative of data components for implementing an extensible directory entry in an extensible file system format in accordance with an embodiment of the invention.

FIG. 10 is a block diagram illustrative of data components for implementing an access control list in an extensible file system format in accordance with an embodiment of the invention.

DETAILED DESCRIPTION

Generally described, the application relates to an extensible file system format and various processes associated with the extensible file system format. In an illustrative embodiment, the extensible file system format corresponds to an extensible file system format for portable storage media and various processes associated with the extensible file system format on the portable storage media. Although one aspect will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

Extensible File Allocation Table (exFAT) is one illustrative embodiment of the disclosed file system. The exFAT embodiment retains both the simplicity and ease of implementation of other FAT-based file systems. In order to keep the simplicity of implementation, and in order to enable implementations on devices with limited memory and processor capacity, the file directory structure has been kept unsorted and "flat". The exFAT embodiment also enables many files (e.g. up to 2,796, 202) in a single directory. In order to find if a target file name exists in a "flat" unsorted directory structure (for example, to create, open, update, or delete a file with that name), a comparison of the target file name can be done against each file record (e.g. DirectoryEntry set). A string comparison can be more processor, power, and energy intensive than an integer comparison. Thus, by first creating a Name Hash based on the target file name, and then only performing a string comparison on file records (e.g. DirectoryEntry sets) which have a matching Name Hash, the speed and efficiency of the operation to find the matching target file name is improved. Similarly, by creating a Name Hash when creating or updating a directory entry for a file, the speed and efficiency of later operations to find this file by name can be improved. In addition, because some computing device systems perform case-insensitive file operations, in some embodiments the hash function can be based on a partly case-insensitive manner. In some embodiments, the file system can embed the lower-case to upper-case translation table on the media. Embedding the lower-case to upper-case translation table can provide support for unicode character mappings which may spring into existence or change in the future, without affecting the resulting hash on existing media. Additional details of an exFAT embodiment can be found more fully described in Appendix A, which begins at page 35.

Figure 1A:
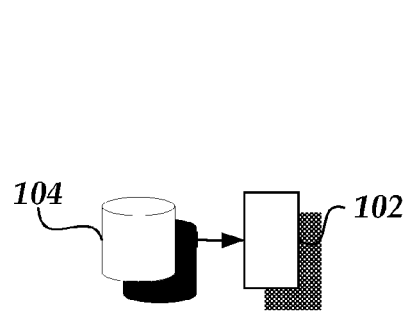
FIGS. 1A-1C are block diagrams illustrative of an illustrative environment including a portable computing device and a storage device implementing the extensible file system format in accordance with embodiments of the invention.
Figure 1B:
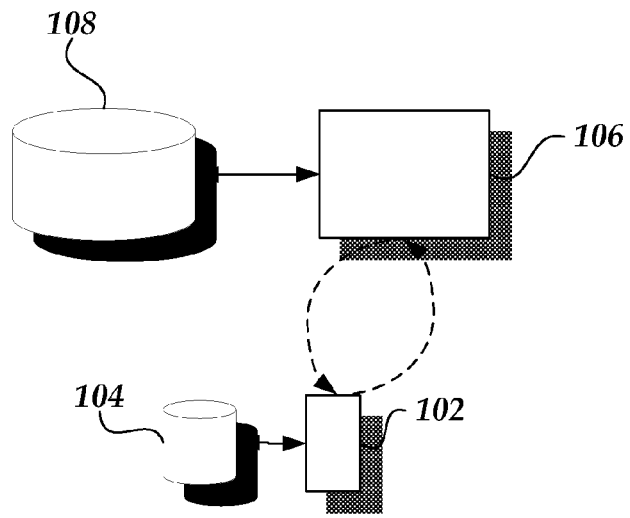
Figure 1C:
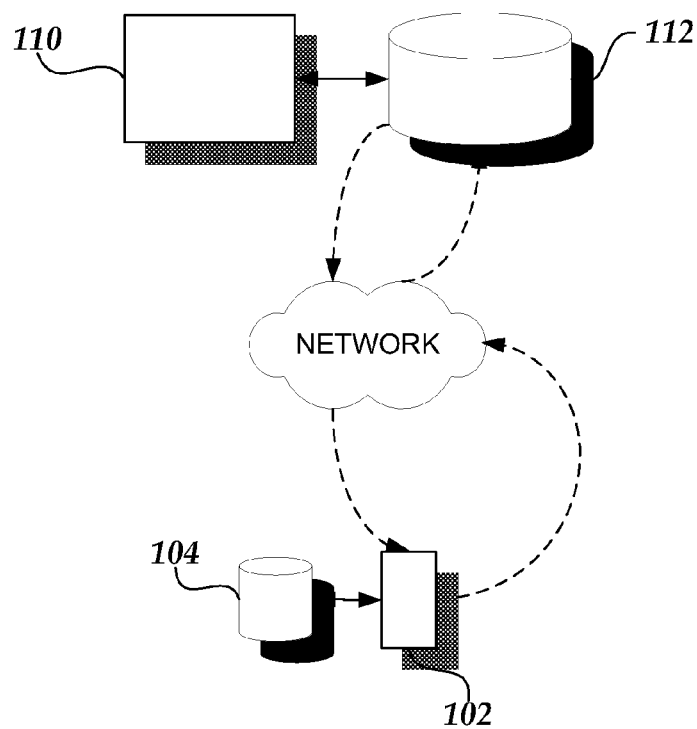

FIGS. 1A-1C are block diagrams illustrative of various operating environments 100 for the extensible file system format. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, microdrives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

Figure 2:
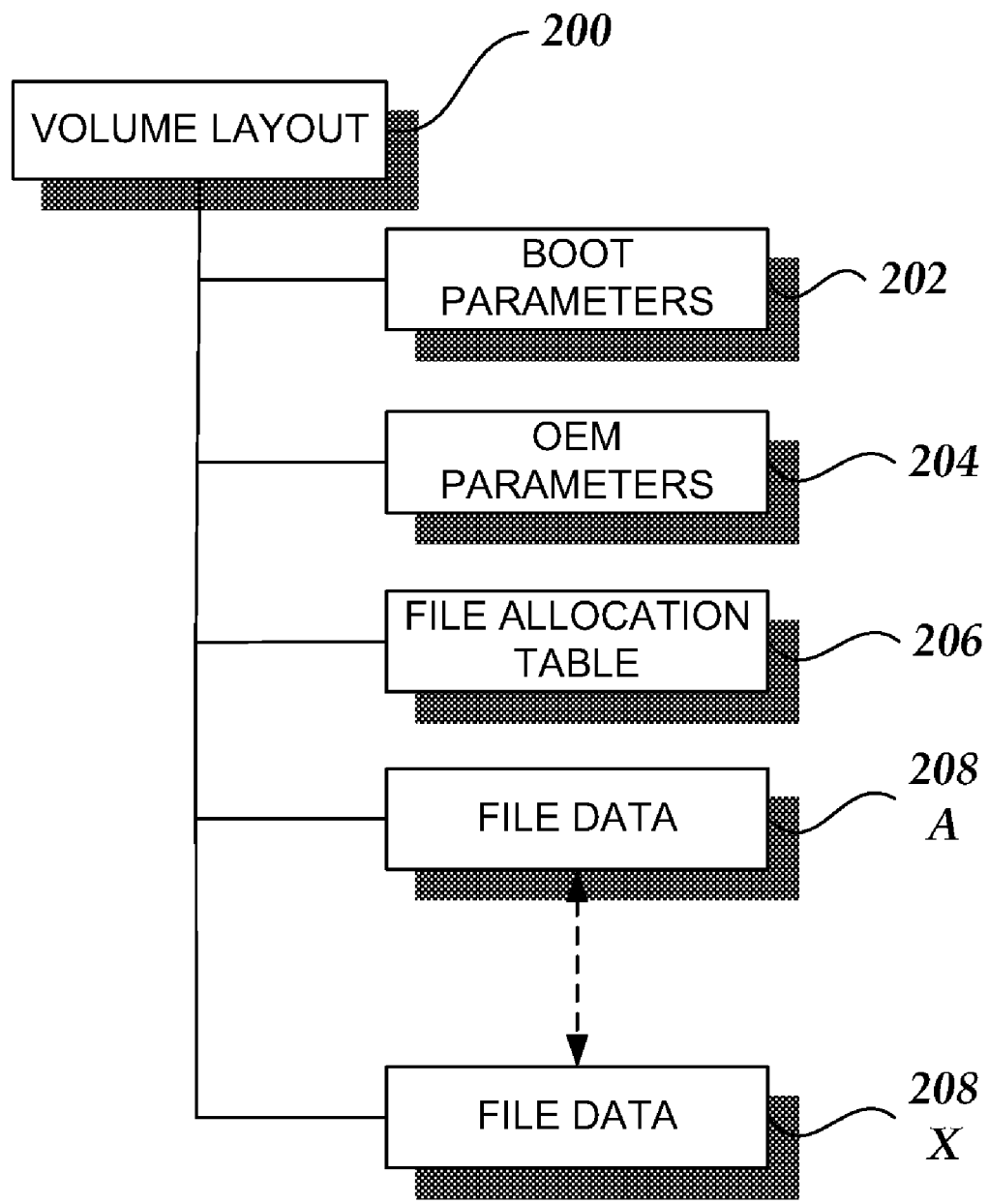
FIG. 2 is a block diagram illustrative of various volume layout components corresponding to an extensible file system format in accordance with an embodiment of the invention.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. The volume layout 200 can still further include series of file data components 208A-208X that correspond to the data stored according to the file system format.

Various data structures for defining a portion of the file data components 208A-208X will be defined with regard to FIGS. 3-10.

Figure 3:
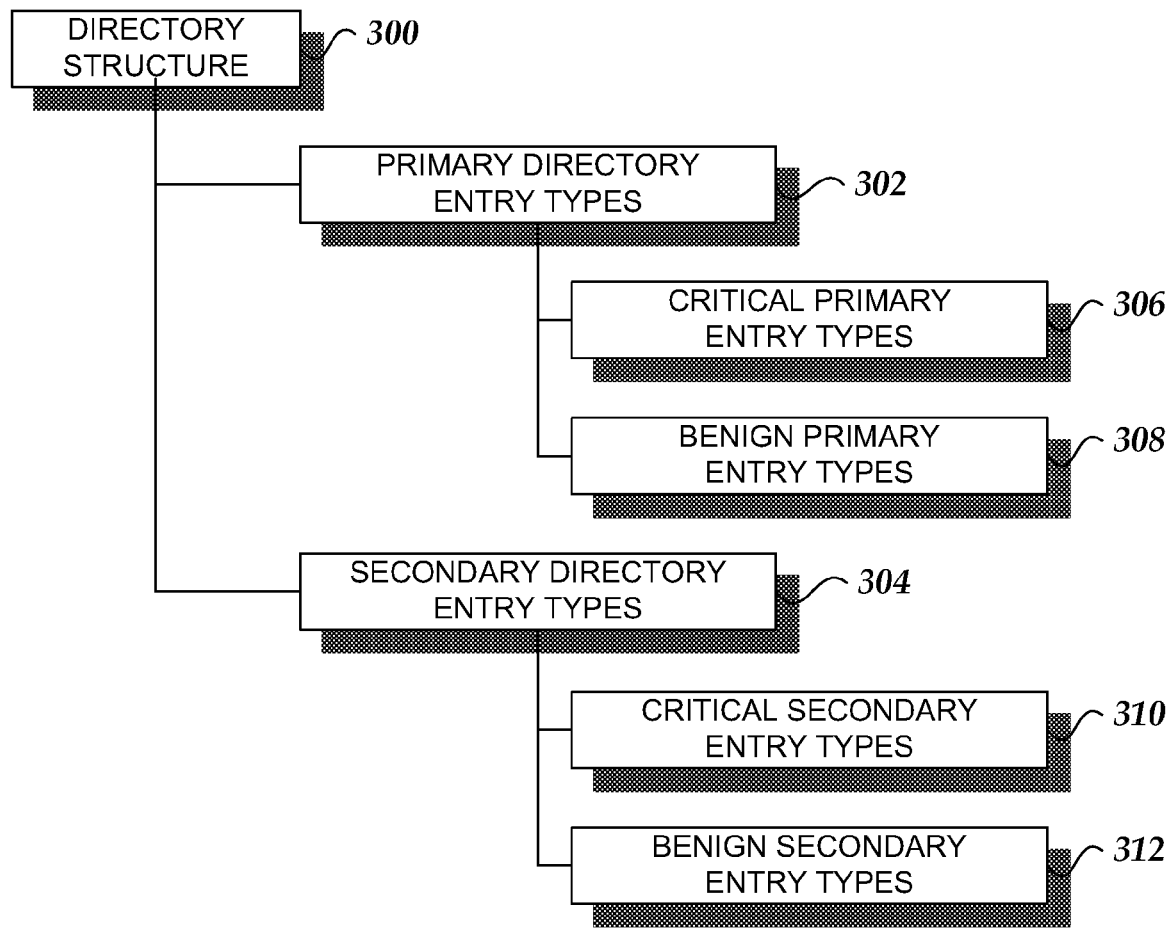
FIG. 3 is a block diagram illustrative of an extensible file system directory structures including primary and secondary directory entry structures in accordance with an embodiment of the invention.

Turning now to FIG. 3, in one aspect, the file data components 208 may include one or more directory entries according to a directory structure 300. In an illustrative embodiment, directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain the volume. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain the volume.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various user-initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a FAT table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 506 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include additional information 810, such as verification information and a starting cluster. One skilled in the relevant art will appreciate that the data components 800 can include a number of additional/alternative rows for implementing the above-identified components 802-810 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 also include a volume identifier 908, such as a global unique identifier. The data components 900 can further include additional information 910, such as verification information and a starting cluster. One skilled in the relevant art will appreciate that the data components 900 can include a number of additional/alternative rows for implementing the above-identified components 902-906 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

Figure 11:
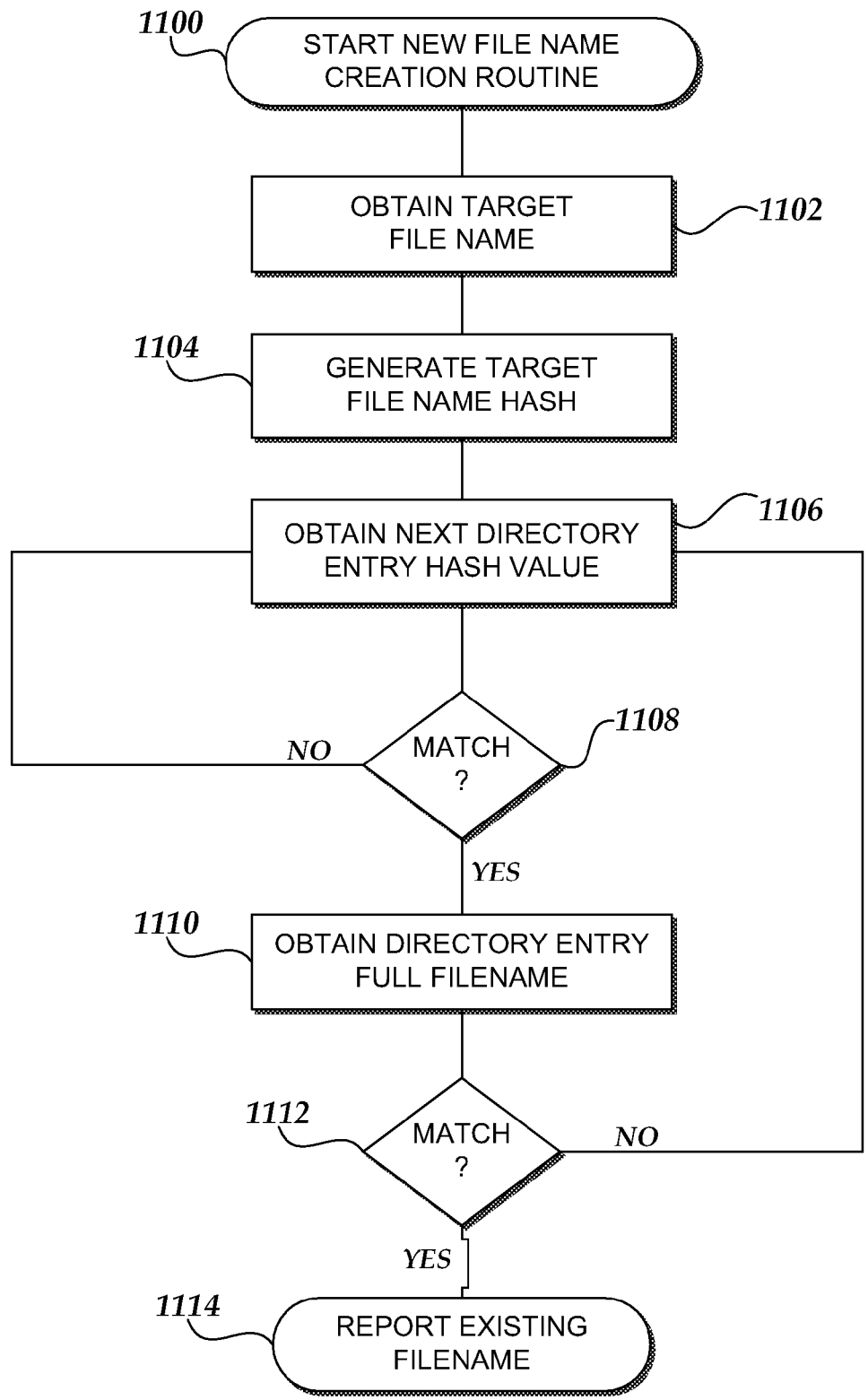
FIG. 11 is a flow diagram illustrative of a file name creation routine for an extensible file system format in accordance with an embodiment of the invention.

With reference now to FIG. 11, a file name creation routine 1100 for an extensible file system format will be described. At block 1102, a file system obtains a request to create a directory entry with a specific file name. In an illustrative embodiment, the specific file name can correspond to a naming convention, such as a digital camera picture naming convention. At block 1104, the file system generates a target name hash. In some embodiments, the specific file name is converted via a conversion table (e.g. an UpCase Table) into a second string prior to generating the target name hash. At block 1106, an iterative loop is begun by examining the next directory entry hash value. An illustrative directory entry type for storing directory entry hash values is described above with regard to data components 600 (FIG. 6).

At decision block 11 08, a test is conducted to determine whether the target hash value matches the current directory entry hash value. This enables implementations to perform a quick comparison when searching for a file by name. Importantly, the NameHash provides a sure verification of a mismatch. However, the NameHash does not provide a sure verification of a match. If they do not match, the routine 1 100 returns to block 1106 (until all the directory entries have been examined. If the hash values match at decision block 1 1 08, at block 1 11 0, the file system obtains the full file name for the potentially matching directory entry. In some embodiments, this comparison is done by comparing the converted versions of the two file names. For example, an embodiment may compare an Up-Cased version of the specific file name against an Up-Cased version of the full file name for the potentially matching directory entry. An illustrative directory entry type for storing directory entry full file names is described above with regard to data components 600 (FIG. 6). At decision block 1112, a test is conducted to determine whether the target file name matches the full file name of the potentially matching directory entry. If so, in block 1114, the routine 1100 terminates by reporting a conflict and the file system will be required to select a new file name. If the full file does not match, the routine 1100 will return to block 1106 to continue checking hash values for the remaining directory entries.

In some embodiments at block 1104, when generating the name hash, the target file name is first converted into a second string via a conversion table. For example, the second string can be an up-cased version of the target file name, and the conversion table can be an Up-Case table. In some embodiments, the conversion table is stored on the same one or more pieces of media that contain the directory entries. The calculation of the name hash can initialize a temporary value to a predetermined start value (e.g. zero). For each character of the second string, the temporary value can be rotated right by one bit, and then have the current character of the second string added to the temporary value.

An example of code implementing one embodiment of the name hash generation written in psuedo-code based on the "C" language:

```
UInt16 NameHash(WCHAR * SecondString, UCHAR NumChar)
{
    UCHAR * Buffer = (UCHAR *)FileName;
    UInt16 Temp =0;
    for (UInt16 Index = 0; Index < NumChar * 2; Index++)
    {
        Temp =      ((Temp&1) ? 0x8000 : 0) | (Temp>>1);
        Temp +=     (UInt16)Buffer[Index];
    }
    return Hash;
}
```

In some embodiments at block 1104, the generating the name hash, either the target file name or the second string may be determined to correspond to a naming convention, such as a digital camera picture naming convention, which uses the same prefix (e.g. "IMG") for many file names. In some embodiments, the calculation of a hash value for a common prefix will always yield the same temporary value (i.e. partial hash) after the hash function includes the common prefix and before it includes the variable portion of the file name. In these embodiments, a common prefix (e.g. "IMG", "IMG00", "IMG01", and the like) can have its corresponding partial hash value pre-computed. Thus, when computing the hash value for a second string with a common prefix, the temporary value may instead be initialized to the pre-computed partial hash value corresponding to the common prefix. The remaining hash generating steps (e.g. rotation and addition steps) would then be applied only to the variable portion of the file name, thus saving a few instruction cycles in the computation of the name hash of the target file name, while resulting in the same name hash.

An example of code implementing one embodiment of the name hash generation for a common prefix, written in psuedo-code based on the "C" language, is as follows:

```
UInt16 NameHash(WCHAR * VariableString, UCHAR NumChar,
UInt16 PrecomputedHash)
{
    UCHAR * Buffer = (UCHAR *)VariableString;
    UInt16 Temp = PrecomputedHash;
    for (UInt16 Index = 0; Index < NumChar * 2; Index++)
    {
        Temp =      ((Temp&1) ? 0x8000 : 0) | (Temp>>1);
        Temp +=     (UInt16)Buffer[Index];
    }
    return Hash;
}
```

As can be appreciated, in the above example pseudo-code, the PrecomputedHash for a name where a portion of the file name does not have a common prefix, the partial hash value may be a predetermined value (e.g. zero), thus allowing the same function to generate the hash for all file names. It will be appreciated that the same operations can be applied to directory entry names. As can be further appreciated, the conversion of the file name to the second string may occur as an integral part of the name hash generation, as opposed to occurring prior to the generation of the hash. For example, in psuedo-code based on the "C" language, the same result occurs with:

```
UInt16 NameHash(WCHAR * TargetFileName, UCHAR NumChar)
{
    UInt16 Temp =0;
    for (UInt16 Index = 0; Index < NumChar; Index++)
    {
        // convert the characters one at a time
        WCHAR x = UpCase(*TargetFileName);
        TargetFileName++;
        // apply both bytes to the hash
        BYTE *z =   (BYTE*)&x;
        Temp =      ((Temp&1) ? 0x8000 : 0) | (Temp>>1);
        Temp +=     (UInt16) (*z);
        z++;
        Temp =      ((Temp&1) ? 0x8000 : 0) | (Temp>>1);
        Temp +=     (UInt16) (*z);
    }
    return Hash;
}
```

Similarly, in some embodiments, if a device only creates files with a limited set of file names (i.e. 10,000 files with names "DSCN0000.JPG", "DSCN0001.JPG", . . . "DSCN9999.JPG"), some or all of these file names may have their hash fully precomputed and stored in a device's memory. Then, when determining if a file exists or creating a new file record, the corresponding precomputed final hash may be simply read from the device's memory.

Figure 12:
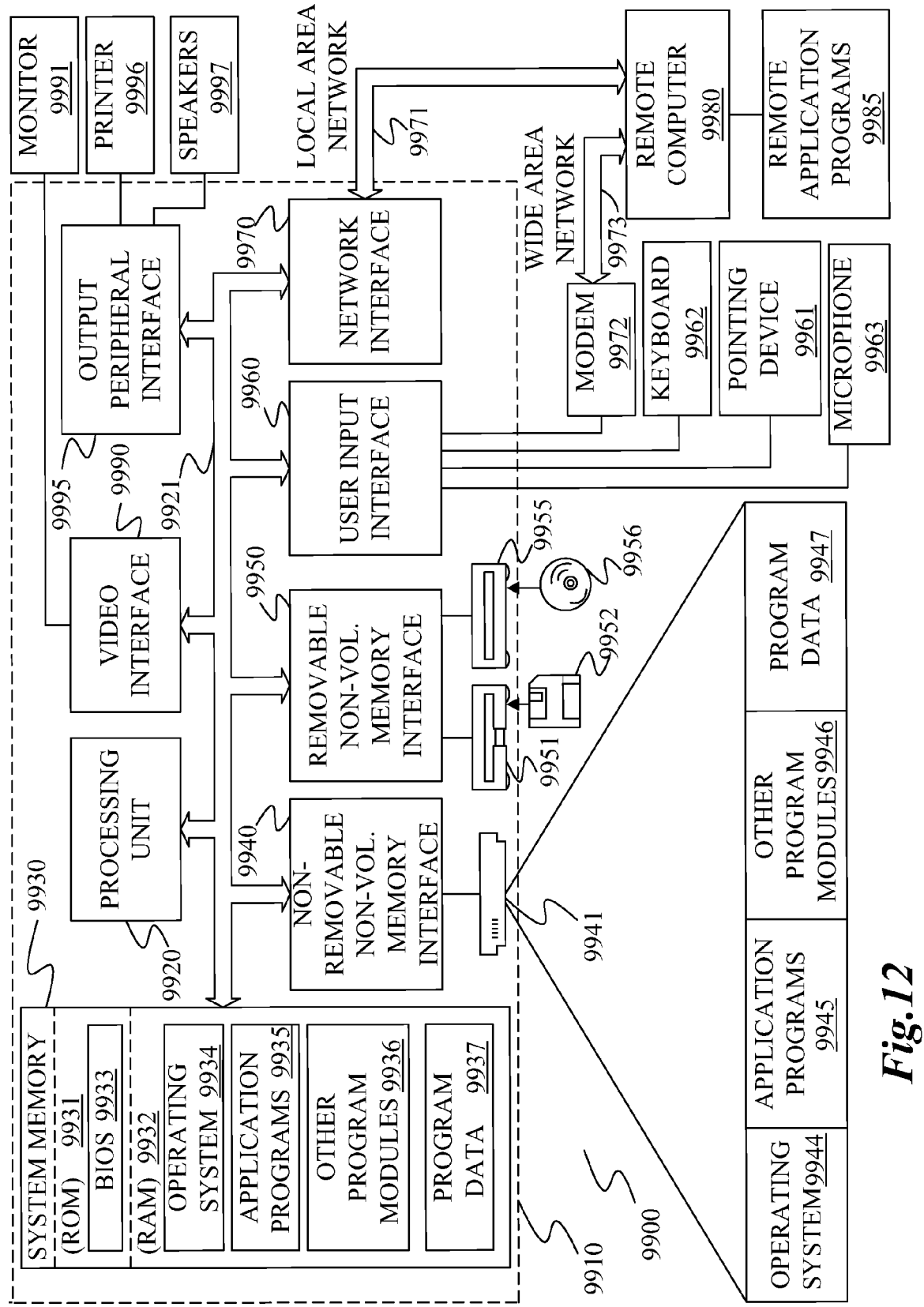
FIG. 12 is an example of a suitable computing system environment for an extensible file system format.

FIG. 12 illustrates an example of a suitable computing system environment 9900 on which embodiments of the invention may be implemented. The computing system environment 9900 is only one example of a suitable computing environment and is not intended to suggest any limitation as to the scope of use or functionality of embodiments of the invention. Neither should the computing environment 9900 be interpreted as having any dependency or requirement relating to any one or combination of components illustrated in the example operating environment 9900.

Embodiments of the invention are operational with numerous other general purpose or special purpose computing systems environments or configurations. Examples of well known computing systems, environments, and/or configurations that may be suitable for use with embodiments of the invention include, but are not limited to, personal computers, server computers, hand-held or laptop devices (such as mobile phones, media players, etc.), multiprocessor systems, microprocessor-based systems, set top boxes, consumer electronics (such as televisions, optical disk players, digital picture frames, etc.), media kiosks, network PCs, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. In some embodiments of the invention, at least a portion of processes described above may be implemented by computer-executable instructions executable by one or more computing systems. Embodiments of the invention may also be practiced in distributed computing environments where tasks are performed by remote processing devices that are linked through a communications network. In a distributed computing environment, program modules may be located in both local and remote computer storage media including memory storage devices.

With reference to FIG. 12, an example system for implementing embodiments of the invention includes a general-purpose computing device in the form of a computer 9910. Components of computer 9910 may include, but are not limited to, a processing unit 9920, a system memory 9930, and a system bus 9921 that couples various system components including the system memory to the processing unit 9920. The system bus 9921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 9910 typically includes a variety of computer readable media. Computer readable media can be any available media that can be accessed by computer 9910 and includes both volatile and nonvolatile media, removable and non-removable media. By way of example, and not limitation, computer readable media may comprise computer storage media and communication media. Computer readable storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 9910. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 9930 includes computer storage media in the form of volatile and/or nonvolatile memory such as read only memory (ROM) 9931 and random access memory (RAM) 9932. A basic input/output system 9933 (BIOS), containing the basic routines that help to transfer information between elements within computer 9910, such as during start-up, is typically stored in ROM 9931. RAM 9932 typically contains data and/or program modules that are immediately accessible to and/or presently being operated on by processing unit 9920. By way of example, and not limitation, FIG. 12 illustrates operating system 9934, application programs 9935, other program modules 9936, and program data 9937.

The computer 9910 may also include other removable/non-removable volatile/nonvolatile computer storage media. By way of example only, FIG. 12 illustrates a hard disk drive 9941 that reads from or writes to non-removable, nonvolatile magnetic media, a magnetic disk drive 9951 that reads from or writes to a removable, nonvolatile magnetic disk 9952, and an optical disk drive 9955 that reads from or writes to a removable, nonvolatile optical disk 9956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 9941 is typically connected to the system bus 9921 through a non-removable memory interface such as interface 9940, and magnetic disk drive 9951 and optical disk drive 9955 are typically connected to the system bus 9921 by a removable memory interface, such as interface 9950.

The drives and their associated computer storage media discussed above and illustrated in FIG. 12, provide storage of computer readable instructions, data structures, program modules and other data for the computer 9910. In FIG. 12, for example, hard disk drive 9941 is illustrated as storing operating system 9944, application programs 9945, other program modules 9946, and program data 9947. Note that these components can either be the same as or different from operating system 9934, application programs 9935, other program modules 9936, and program data 9937. Operating system 9944, application programs 9945, other program modules 9946, and program data 9947 are given different numbers here to illustrate that, at a minimum, they are different copies.

A user may enter commands and information into the computer 9910 through input devices such as a keyboard 9962, a microphone 9963, and a pointing device 9961, such as a mouse, trackball or touch pad. Other input devices (not shown) may include a joystick, game pad, satellite dish, scanner, or the like. These and other input devices are often connected to the processing unit 9920 through a user input interface 9960 that is coupled to the system bus, but may be connected by other interface and bus structures, such as a parallel port, game port or a universal serial bus (USB). A monitor 9991 or other type of display device is also connected to the system bus 9921 via an interface, such as a video interface 9990. In addition to the monitor, computers may also include other peripheral output devices such as speakers 9997 and printer 9996, which may be connected through an output peripheral interface 9995.

The computer 9910 may operate in a networked environment using logical connections to one or more remote computers, such as a remote computer 9980. The remote computer 9980 may be a personal computer, a hand-held device, a server, a router, a network PC, a peer device or other common network node, and typically includes many or all of the elements described above relative to the computer 9910. The logical connections depicted in FIG. 12 include a local area network (LAN) 9971 and a wide area network (WAN) 9973, but may also include other networks. Such networking environments are commonplace in offices, enterprise-wide computer networks, intranets and the Internet.

When used in a LAN networking environment, the computer 9910 is connected to the LAN 9971 through a network interface or adapter 9970. When used in a WAN networking environment, the computer 9910 typically includes a modem 9972 or other means for establishing communications over the WAN 9973, such as the Internet. The modem 9972, which may be internal or external, may be connected to the system bus 9921 via the user input interface 9960, or other appropriate mechanism. In a networked environment, program modules depicted relative to the computer 9910, or portions thereof, may be stored in the remote memory storage device. By way of example, and not limitation, FIG. 12 illustrates remote application programs 9985 as residing on remote computer 9980. It will be appreciated that the network connections shown are example and other means of establishing a communications link between the computers may be used. In an example embodiment, various additional functionality may be added through the specification of specific directory types. For example, name streams may be supported by specifying a name stream directory entry. Additionally, on-disk encryption may also be supported through the utilization of specific encryption algorithms and key exchanges. Still further, time zone conversions may be associated with directory entries to automatically convert a current time zone with a time zone with the directory entry was made.

In an example embodiment, the file structures used in the file system described herein can be those described more fully in Appendix A.

While illustrative embodiments have been illustrated and described, it will be appreciated that various changes can be made therein without departing from the spirit and scope of that which is disclosed herein.

APPENDIX A

Introduction

The exFAT file system is the successor to FAT32 in the FAT family of file systems. This appendix describes portions of the exFAT file system.

Specific Terminology

In the context of this appendix, certain terms (see Table 1) carry specific meaning for the design and implementation of the exFAT file system.

TABLE 1

Definition of Terms Which Carry Very Specific Meaning

| Term | Definition |
|---|---|
| Shall | This appendix uses the term "shall" to describe a behavior which is mandatory. |
| Should | This appendix uses the term "should" to describe a behavior which it strongly recommends, but does not make mandatory. |
| May | This appendix uses the term "may" to describe a behavior which is optional. |
| Mandatory | This term describes a field or structure which an implementation shall modify and shall interpret as this appendix describes. |
| Optional | This term describes a field or structure which an implementation may or may not support. If an implementation supports a given optional field or structure, it shall modify and shall interpret the field or structure as this appendix describes. |

TABLE 1-continued

Definition of Terms Which Carry Very Specific Meaning

| Term | Definition |
|---|---|
| Undefined | This term describes field or structure contents which an implementation may modify as necessary (i.e. clear to zero when setting surrounding fields or structures) and shall not interpret to hold any specific meaning. |
| Reserved | This term describes field or structure contents which implementations: 1. Shall initialize to zero and should not use for any purpose 2. Should not interpret, except when computing checksums 3. Shall preserve across operations which modify surrounding fields or structures |

Full Text of Common Acronyms

This appendix uses acronyms in common use in the personal computer industry (see Table 2).

TABLE 2

Full Text of Common Acronyms

| Acronym | Full Text |
|---|---|
| ASCII | American Standard Code for Information Interchange |
| BIOS | Basic Input Output System |
| CPU | Central Processing Unit |
| exFAT | extensible File Allocation Table |
| FAT | File Allocation Table |
| FAT12 | File Allocation Table, 12-bit cluster indices |
| FAT16 | File Allocation Table, 16-bit cluster indices |
| FAT32 | File Allocation Table, 32-bit cluster indices |
| GPT | GUID Partition Table |
| GUID | Globally Unique Identifier |
| INT | Interrupt |
| MBR | Master Boot Record |
| TexFAT | Transaction-safe exFAT |

Default Field and Structure Qualifiers

Fields and structures in this appendix have the following qualifiers (see list below), unless the appendix notes otherwise.

1. Are unsigned
2. Use decimal notation to describe values, where not otherwise noted; this appendix uses the post-fix letter "h" to denote hexadecimal numbers and encloses GUIDs in curly braces
3. Are in little endian format
4. Do not require a null-terminating character for strings Volume Structure A volume is the set of all file system structures and data space necessary to store and retrieve user data. All exFAT volumes contain four regions (see Table 3).

TABLE 3

Volume Structure

| Sub-region Name | Offset (sector) | Size (sectors) | Comments |
|---|---|---|---|
| Main Boot Region | | | |
| Main Boot Sector | 0 | 1 | This sub-region is mandatory. |
| Main Extended Boot Sectors | 1 | 8 | This sub-region is mandatory. |
| Main OEM Parameters | 9 | 1 | This sub-region is mandatory. |
| Main Reserved | 10 | 1 | This sub-region is mandatory. |

TABLE 3-continued

| | | Volume Structure | |
|---|---|---|---|
| Sub-region Name | Offset (sector) | Size (sectors) | Comments |
| Main Boot Checksum | 11 | 1 | This sub-region is mandatory. |
| | | Backup Boot Region | |
| Backup Boot Sector | 12 | 1 | This sub-region is mandatory. |
| Backup Extended Boot Sectors | 13 | 8 | This sub-region is mandatory. |
| Backup OEM Parameters | 21 | 1 | This sub-region is mandatory. |
| Backup Reserved | 22 | 1 | This sub-region is mandatory. |
| Backup Boot Checksum | 23 | 1 | This sub-region is mandatory. |
| | | FAT Region | |
| FAT Alignment | 24 | FatOffset − 24 | This sub-region is mandatory and its contents, if any, are undefined. Note: the Main and Backup Boot Sectors both contain the FatOffset field. |
| First FAT | FatOffset | FatLength | This sub-region is mandatory. Note: the Main and Backup Boot Sectors both contain the FatOffset and FatLength fields. |
| Second FAT | FatOffset + FatLength | FatLength * (NumberOfFats − 1) | This sub-region is mandatory. Note: the Main and Backup Boot Sectors both contain the FatOffset, FatLength, and NumberOfFats fields. The NumberOfFats field may only hold values 1 and 2. |
| | | Data Region | |
| Cluster Heap Alignment | FatOffset + FatLength * NumberOfFats | ClusterHeapOffset − (FatOffset + FatLength * NumberOfFats) | This sub-region is mandatory and its contents, if any, are undefined. Note: the Main and Backup Boot Sectors both contain the FatOffset, FatLength, NumberOfFats, and ClusterHeapOffset fields. The NumberOfFats field's valid values are 1 and 2. |
| Cluster Heap | ClusterHeapOffset | ClusterCount * $2^{SectorsPerClusterShift}$ | This sub-region is mandatory. Note: the Main and Backup Boot Sectors both contain the ClusterHeapOffset, ClusterCount, and SectorsPerClusterShift fields. |
| Excess Space | ClusterHeapOffset + ClusterCount * $2^{SectorsPerClusterShift}$ | VolumeLength − (ClusterHeapOffset + ClusterCount * $2^{SectorsPerClusterShift}$) | This sub-region is mandatory and its contents, if any, are undefined. Note: the Main and Backup Boot Sectors both contain the ClusterHeapOffset, ClusterCount, SectorsPerClusterShift, and VolumeLength fields. |

Main and Backup Boot Regions

The Main Boot region provides all the necessary boot-strapping instructions, identifying information, and file system parameters to enable an implementation to perform the following:

1. Boot-strap a computer system from an exFAT volume.
2. Identify the file system on the volume as exFAT.
3. Discover the location of the exFAT file system structures.

The Backup Boot region is a backup of the Main Boot region. It aids recovery of the exFAT volume in the advent of the Main Boot region being in an inconsistent state.

Main and Backup Boot Sector Sub-Regions

The Main Boot Sector contains code for boot-strapping from an exFAT volume and fundamental exFAT parameters which describe the volume structure (see Table 4). BIOS, MBR, or other boot-strapping agents may inspect this sector and may load and execute any boot-strapping instructions contained therein.

The Backup Boot Sector is a backup of the Main Boot Sector and has the same structure (see Table 4).

TABLE 4

Main and Backup Boot Sector Structure

| Field Name | Offset (byte) | Size (bytes) | Comments |
|---|---|---|---|
| JumpBoot | 0 | 3 | This field is mandatory. |
| FileSystemName | 3 | 8 | This field is mandatory. |
| MustBeZero | 11 | 53 | This field is mandatory. |
| PartitionOffset | 64 | 8 | This field is mandatory. |
| VolumeLength | 72 | 8 | This field is mandatory. |
| FatOffset | 80 | 4 | This field is mandatory. |
| FatLength | 84 | 4 | This field is mandatory. |
| ClusterHeapOffset | 88 | 4 | This field is mandatory. |
| ClusterCount | 92 | 4 | This field is mandatory. |
| FirstClusterOfRoot Directory | 96 | 4 | This field is mandatory. |
| VolumeSerialNumber | 100 | 4 | This field is mandatory. |
| FileSystemRevision | 104 | 2 | This field is mandatory. |
| VolumeFlags | 106 | 2 | This field is mandatory. |
| BytesPerSectorShift | 108 | 1 | This field is mandatory. |
| SectorsPerClusterShift | 109 | 1 | This field is mandatory. |
| NumberOfFats | 110 | 1 | This field is mandatory. |
| DriveSelect | 111 | 1 | This field is mandatory. |
| PercentInUse | 112 | 1 | This field is mandatory. |
| Reserved | 113 | 7 | This field is mandatory. |
| BootCode | 120 | 390 | This field is mandatory. |
| BootSignature | 510 | 2 | This field is mandatory. |
| ExcessSpace | 512 | $2^{BytesPerSectorShift} - 512$ | This field is mandatory and its contents, if any, are undefined. |

TABLE 4-continued

Main and Backup Boot Sector Structure

| Field Name | Offset (byte) | Size (bytes) | Comments |
|---|---|---|---|
| | | | Note: the Main and Backup Boot Sectors both contain the BytesPerSectorShift field. |

JumpBoot Field

The JumpBoot field contains the jump instruction for CPUs common in personal computers, which, when executed, "jumps" the CPU to execute the boot-strapping instructions in the BootCode field.

The valid value for this field is (in order of low-order byte to high-order byte) EBh 76h 90h.

FileSystemName Field

The FileSystemName field contains the name of the file system on the volume.

The valid value for this field is, in ASCII characters, "EXFAT", which includes three trailing white spaces.

MustBeZero Field

The MustBeZero field directly corresponds with the range of bytes the packed BIOS parameter block consumes on FAT12/16/32 volumes.

The valid value for this field is 0, which helps to prevent FAT12/16/32 implementations from mistakenly mounting an exFAT volume.

PartitionOffset Field

The PartitionOffset field describes the media-relative sector offset of the partition which hosts the given exFAT volume. This field aids boot-strapping from the volume using extended INT 13h on personal computers.

All possible values for this field are valid; however, the value 0 indicates implementations shall ignore this field.

VolumeLength Field

The VolumeLength field describes the size of the given exFAT volume in sectors.

The valid range of values for this field is:

At least $2^{20}/2^{BytesPerSecorShift}$, which ensures the smallest volume is no less than 1 MB At most $2^{64}-1$, the largest value this field can describe However, if the size of the Excess Space sub-region is 0, then the value of this field is ClusterHeapOffset+$(2^{32}-11)$*$2^{SectorsPerClusterShift}$.

FatOffset Field

The FatOffset field describes the volume-relative sector offset of the First FAT.

The valid range of values for this field is:

At least 24, which accounts for the sectors the Main Boot and Backup Boot regions consume At most ClusterHeapOffset−(FatLength*NumberOfFats), which accounts for the sectors the Cluster Heap consumes FatLength Field The FatLength field describes the length, in sectors, of each FAT table (the volume may contain up to two FATs).

The valid range of values for this field is:

At least (ClusterCount+2)*$2^2$/$2^{BytesPerSectorShift}$ rounded up to the nearest integer, which ensures each FAT has sufficient space for describing all the clusters in the Cluster Heap At most (ClusterHeapOffset−FatOffset)/NumberOfFats rounded down to the nearest integer, which ensures the FATs exist before the Cluster Heap This field may contain a value in excess of its lower bound (as described above) to enable the Second FAT, if present, to also be aligned to the characteristics of the underlying storage media. The contents of space which exceeds what the FAT itself requires, if any, are undefined.

ClusterHeapOffset Field

The ClusterHeapOffset field describes the volume-relative sector offset of the Cluster Heap. This field enables implementations to align the Cluster Heap to the characteristics of the underlying storage media.

The valid range of values for this field is:
At least FatOffset+FatLength*NumberOfFats, to account for the sectors all the preceding regions consume
At most $2^{32}-1$ or VolumeLength−(ClusterCount*$2^{SectorsPerClusterShift}$), whichever calculation is less ClusterCount Field The ClusterCount field describes the number of clusters the Cluster Heap contains.

The valid value for this field is the lesser of the following:
(VolumeLength−ClusterHeapOffset)/$2^{SectorsPerClusterShift}$ rounded down to the nearest integer, which is exactly the number of clusters which can fit between the beginning of the Cluster Heap and the end of the volume
$2^{32}-11$, which is the maximum number of clusters a FAT can describe The value of the ClusterCount field determines the minimum size of a FAT.

FirstClusterOfRootDirectory Field

The FirstClusterOfRootDirectory field contains the cluster index of the first cluster of the root directory. The valid range of values for this field is:
At least 2, the index of the first cluster in the Cluster Heap
At most ClusterCount+1, the index of the last cluster in the Cluster Heap VolumeSerialNumber Field The VolumeSerialNumber field contains a unique serial number. All possible values for this field are valid.

FileSystemRevision Field

The FileSystemRevision field describes the major and minor revision numbers of the exFAT structures on the given volume.

The high-order byte is the major revision number and the low-order byte is the minor revision number. For example, if the high-order byte contains the value 01h and if the low-order byte contains the value 05h, then the FileSystemRevision field describes the revision number 1.05. Likewise, if the high-order byte contains the value 0Ah and if the low-order byte contains the value 0Fh, then the FileSystemRevision field describes the revision number 10.15.

The valid range of values for this field is:
At least 0 for the low-order byte and 1 for the high-order byte
At most 99 for the low-order byte and 99 for the high-order byte The revision number of exFAT this appendix describes is 1.00.

VolumeFlags Field

The VolumeFlags field contains flags which indicate the status of various file system structures on the exFAT volume (see Table 5).

TABLE 5

VolumeFlags Field Structure

| Field Name | Offset (bit) | Size (bits) | Comments |
|---|---|---|---|
| ActiveFat | 0 | 1 | This field is mandatory. |
| VolumeDirty | 1 | 1 | This field is mandatory. |
| MediaFailure | 2 | 1 | This field is mandatory. |
| ClearToZero | 3 | 1 | This field is mandatory. |
| Reserved | 4 | 12 | This field is mandatory and its contents are reserved. |

ActiveFat Field

The ActiveFat field describes which FAT and Allocation Bitmap are active (and implementations shall use), as follows:
0, which means the First FAT and First Allocation Bitmap are active
1, which means the Second FAT and Second Allocation Bitmap are active and is possible only when the NumberOfFats field contains the value 2

Implementations shall consider the inactive FAT and Allocation Bitmap as stale.

VolumeDirty Field

The VolumeDirty field describes whether the volume is dirty or not, as follows:
0, which means the volume claims to be in a consistent state
1, which means the volume is potentially in an inconsistent state MediaFailure Field The MediaFailure field describes whether an implementation has discovered media failures or not, as follows:
0, which means the hosting media has not reported failures or any known failures are already recorded in the FAT as "bad" clusters
1, which means the hosting media has reported failures (i.e. has failed read or write operations)

ClearToZero Field

The ClearToZero field does not have significant meaning in this appendix.

The valid values for this field are:
0, which does not have any particular meaning
1, which means implementations shall clear it to 0 prior to modifying any file system structures, directories, or files BytesPerSectorShift Field The BytesPerSectorShift field describes the bytes per sector expressed as $\log_2(N)$, where N is the number of bytes per sector. For example, for 512 bytes per sector, the value of this field is 9.

The valid range of values for this field is:
At least 9 (sector size of 512 bytes), which is the smallest sector possible for an exFAT volume
At most 12 (sector size of 4096 bytes), which is the memory page size of CPUs common in personal computers SectorsPerClusterShift Field The SectorsPerClusterShift field describes the sectors per cluster expressed as $\log_2(N)$, where N is number of sectors per cluster. For example, for 8 sectors per cluster, the value of this field is 3.

The valid range of values for this field is:

At least 0 (1 sector per cluster), which is the smallest cluster possible

At most 25-BytesPerSectorShift, which evaluates to a cluster size of 32 MB

NumberOfFats Field

The NumberOfFats field describes the number of FATs and Allocation Bitmaps the volume contains.

The valid range of values for this field is:

1, which indicates the volume only contains the First FAT and First Allocation Bitmap 2, which indicates the volume contains the First FAT, Second FAT, First Allocation Bitmap, and Second Allocation Bitmap; this value is only valid for TexFAT volumes DriveSelect Field The DriveSelect field contains the extended INT 13h drive number, which aids boot-strapping from this volume using extended INT 13h on personal computers.

All possible values for this field are valid. Similar fields in previous FAT-based file systems frequently contained the value 80h.

PercentInUse Field

The PercentInUse field describes the percentage of clusters in the Cluster Heap which are allocated.

The valid range of values for this field is:

Between 0 and 100 inclusively, which is the percentage of allocated clusters in the Cluster Heap, rounded down to the nearest integer Exactly FFh, which indicates the percentage of allocated clusters in the Cluster Heap is not available BootCode Field The BootCode field contains boot-strapping instructions.

BootSignature Field

The BootSignature field describes whether the intent of given sector is for it to be a Boot Sector or not.

The valid value for this field is AA55h.

Main and Backup Extended Boot Sectors Sub-Regions

Each sector of the Main Extended Boot Sectors has the same structure; however, each sector may hold distinct boot-strapping instructions (see Table 6).

The Backup Extended Boot Sectors is a backup of the Main Extended Boot Sectors and has the same structure (see Table 6).

TABLE 6

Extended Boot Sector Structure

| Field Name | Offset (byte) | Size (bytes) | Comments |
|---|---|---|---|
| Extended-BootCode | 0 | $2^{BytesPerSectorShift} - 4$ | This field is mandatory. Note: the Main and Backup Boot Sectors both contain the BytesPerSectorShift field. |
| Extended-BootSignature | $2^{BytesPerSectorShift} - 4$ | 4 | This field is mandatory. Note: the Main and Backup Boot Sectors both contain the BytesPerSectorShift field. |

ExtendedBootCode Field

The ExtendedBootCode field contains boot-strapping instructions.

ExtendedBootSignature Field

The ExtendedBootSignature field describes whether the intent of given sector is for it to be an Extended Boot Sector or not.

The valid value for this field is AA50000h.

Main and Backup OEM Parameters Sub-Regions

The Main OEM Parameters contains ten parameters structures which contain manufacturer-specific information (see Table 7). Each of the ten parameters structures derives from the Generic Parameters template. This appendix itself defines only one parameters structure: the Flash Parameters structure.

The Backup OEM Parameters is a backup of the Main OEM Parameters and has the same structure (see Table 7).

TABLE 7

OEM Parameters Structure

| Field Name | Offset (byte) | Size (bytes) | Comments |
|---|---|---|---|
| Parameters[0] | 0 | 48 | This field is mandatory. |
| . | . | . | . |
| . | . | . | . |
| . | . | . | . |
| Parameters[9] | 432 | 48 | This field is mandatory. |
| Reserved | 480 | $2^{BytesPerSectorShift} - 480$ | This field is mandatory and its contents are reserved. Note: the Main and Backup Boot Sectors both contain the BytesPerSectorShift field. |

Parameters[0] . . . Parameters[9]

Each Parameters field in this array contains a parameters structure, which derives from the Generic Parameters template.

Any unused Parameters field shall be described as unused. When creating or appending to this array, implementations should consolidate unused Parameters structures at the end of the array, thereby leaving all other Parameters structures at the beginning of the array.

Generic Parameters Template

The Generic Parameters template provides the base definition of a parameters structure (see Table 8). All parameters structures derive from this template. Support for this Generic Parameters template is mandatory.

TABLE 8

Generic Parameters Template

| Field Name | Offset (byte) | Size (bytes) | Comments |
|---|---|---|---|
| ParametersGuid | 0 | 16 | This field is mandatory. |
| CustomDefined | 16 | 32 | This field is mandatory and the structures which derive from this template define its contents. |

ParametersGuid Field

The ParametersGuid field describes a GUID, which determines the layout of the remainder of the given parameters structure.

All possible values for this field are valid.

The value, in GUID notation, {00000000-0000-0000-0000-000000000000}, indicates the given parameters structure is unused.

Main and Backup Boot Checksum Sub-Regions

The Main and Backup Boot Checksum contain a repeating pattern of the four-byte checksum of the contents of all other sub-regions in their respective Boot regions. The checksum calculation does not include the VolumeFlags and PercentInUse fields in their respective Boot Sector. The repeating pattern of the four-byte checksum fills its respective Boot Checksum sub-region from the beginning to the end of the sub-region.

File Allocation Table Region

The File Allocation Table (FAT) region may contain up to two FATs, one in the First FAT sub-region and another in the Second FAT sub-region. The NumberOfFats field describes how many FATs this region contains. The valid values for the NumberofFats field are 1 and 2. Therefore, the First FAT sub-region always contains a FAT. If the NumberOfFats field is two, then the Second FAT sub-region also contains a FAT.

The ActiveFat field of the VolumeFlags field describes which FAT is active. Only the VolumeFlags field in the Main Boot Sector is current.

First and Second Fat Sub-Regions

A FAT describes cluster chains in the Cluster Heap (see Table 9). A cluster chain is a series of clusters which provides space for recording the contents of files, directories, and other file system structures. A FAT represents a cluster chain as a singly-linked list of cluster indices. With the exception of the first two entries, every entry in a FAT represents exactly one cluster.

TABLE 9

File Allocation Table Structure

| Field Name | Offset (byte) | Size (bytes) | Comments |
|---|---|---|---|
| FatEntry[0] | 0 | 4 | This field is mandatory. |
| FatEntry[1] | 4 | 4 | This field is mandatory. |
| FatEntry[2] | 8 | 4 | This field is mandatory. |
| . | . | . | . |
| . | . | . | . |
| . | . | . | . |
| FatEntry [ClusterCount +1] | (Cluster Count + 1) * 4 | 4 | This field is mandatory. ClusterCount + 1 can never exceed FFFFFFF6h. Note: the Main and Backup Boot Sectors both contain the ClusterCount field. |
| ExcessSpace | (Cluster Count + 2) * 4 | (FatLength * $2^{BytesPerSectorShift}$) − ((ClusterCount + 2) * 4) | This field is mandatory and its contents, if any, are undefined. Note: the Main and Backup Boot Sectors both contain the ClusterCount, FatLength, and BytesPerSectorShift fields. |

FatEntry[0] Field

The FatEntry[0] field describes the media type in the first byte (the lowest order byte) and contains FFh in the remaining three bytes.

The media type (the first byte) should be F8h.

FatEntry[1] Field

The FatEntry[1] field only exists due to historical precedence and does not describe anything of interest.

The valid value for this field is FFFFFFFFh.

FatEntry[2] . . . FatEntry[ClusterCount+1] Fields

Each FatEntry field in this array represents a cluster in the Cluster Heap. FatEntry[2] represents the first cluster in the Cluster Heap and FatEntry[ClusterCount+1] represents the last cluster in the Cluster Heap.

The valid range of values for these fields is:

Between 2 and ClusterCount+1, inclusively, which points to the next FatEntry in the given cluster chain; the given FatEntry shall not point to any FatEntry which precedes it in the given cluster chain Exactly FFFFFFF7h, which marks the given FatEntry's corresponding cluster as "bad"

Exactly FFFFFFFFh, which marks the given FatEntry's corresponding cluster as the last cluster of a cluster chain; this is the only valid value for the last FatEntry of any given cluster chain Data Region The Data region contains the Cluster Heap, which provides managed space for file system structures, directories, and files.

Cluster Heap Sub-Region

The Cluster Heap's structure is very simple (see Table 10); each consecutive series of sectors describes one cluster, as the SectorsPerClusterShift field defines. Importantly, the first cluster of the Cluster Heap has index two, which directly corresponds to the index of FatEntry[2].

In an exFAT volume, an Allocation Bitmap maintains the record of the allocation state of all clusters. This is a significant difference from exFAT's predecessors (FAT12, FAT16, and FAT32), in which a FAT maintained a record of the allocation state of all clusters in the Cluster Heap.

TABLE 10

Cluster Heap Structure

| Field Name | Offset (sector) | Size (sectors) | Comments |
|---|---|---|---|
| Cluster[2] | ClusterHeapOffset | $2^{SectorsPerClusterShift}$ | This field is mandatory. Note: the Main and Backup Boot Sectors both contain the ClusterHeapOffset and SectorsPerClusterShift fields. |
| . | . | . | . |
| . | . | . | . |
| Cluster [ClusterCount +1] | ClusterHeapOffset + (ClusterCount − 1) * $2^{SectorsPerClusterShift}$ | $2^{SectorsPerClusterShift}$ | This field is mandatory. Note: the Main and Backup Boot Sectors both contain the ClusterCount, ClusterHeapOffset, and SectorsPerClusterShift fields. |

Cluster[2] . . . Cluster[ClusterCount+1] Fields

Each Cluster field in this array is a series of contiguous sectors, as the SectorsPerClusterShift field defines.

Directory Structure

The exFAT file system uses a directory tree approach to manage the file system structures and files which exist in the Cluster Heap. Directories have a one-to-many relationship between parent and child in the directory tree.

The directory to which the FirstClusterOfRootDirectory field refers is the root of the directory tree. All other directories descend from the root directory in a singly-linked fashion.

Each directory consists of a series of directory entries (see Table 11).

One or more directory entries combine into a directory entry set which describes something of interest, such as a file system structure, sub-directory, or file.

TABLE 11

Directory Structure

| Field Name | Offset (byte) | Size (byte) | Comments |
| --- | --- | --- | --- |
| DirectoryEntry[0] | 0 | 32 | This field is mandatory. |
| . | . | . | . |
| . | . | . | . |
| . | . | . | . |
| DirectoryEntry[N − 1] | (N − 1) * 32 | 32 | This field is mandatory. N, the number of DirectoryEntry fields, is the size, in bytes, of the cluster chain which contains the given directory, divided by the size of a DirectoryEntry field, 32 bytes. |

DirectoryEntry[0] . . . DirectoryEntry[N−1]

Each DirectoryEntry field in this array derives from the Generic DirectoryEntry template.

Generic DirectoryEntry Template

The Generic DirectoryEntry template provides the base definition for directory entries (see Table 12). All directory entry structures derive from this template and only Microsoft-defined directory entry structures are valid (exFAT does not have provisions for manufacturer-defined directory entry structures). The ability to interpret the Generic DirectoryEntry template is mandatory.

TABLE 12

Generic DirectoryEntry Template

| Field Name | Offset (byte) | Size (byte) | Comments |
| --- | --- | --- | --- |
| EntryType | 0 | 1 | This field is mandatory. |
| CustomDefined | 1 | 19 | This field is mandatory and structures which derive from this template may define its contents. |
| FirstCluster | 20 | 4 | This field is mandatory. |
| DataLength | 24 | 8 | This field is mandatory. |

EntryType Field

The EntryType field has three modes of usage which the value of the field defines (see list below).
   00h, which is an end-of-directory marker and the following conditions apply:
      All other fields in the given DirectoryEntry are actually reserved
      All subsequent directory entries in the given directory also are end-of-directory markers
      End-of-directory markers are only valid outside directory entry sets
   Between 01h and 7Fh inclusively, which is an unused-directory-entry marker and the following conditions apply:
      All other fields in the given DirectoryEntry are actually undefined
      Unused directory entries are only valid outside of directory entry sets
      This range of values corresponds to the InUse field containing the value 0
   Between 81h and FFh inclusively, which is a regular directory entry and the following conditions apply:
      The contents of the EntryType field (see Table 13) determine the layout of the remainder of the DirectoryEntry structure
      This range of values, and only this range of values, are valid inside a directory entry set
      This range of values directly corresponds to the InUse field containing the value 1
   The value 80h is invalid.

TABLE 13

Generic EntryType Field Structure

| Field Name | Offset (bit) | Size (bits) | Comments |
| --- | --- | --- | --- |
| TypeCode | 0 | 5 | This field is mandatory. |
| TypeImportance | 5 | 1 | This field is mandatory. |
| TypeCategory | 6 | 1 | This field is mandatory. |
| InUse | 7 | 1 | This field is mandatory. |

TypeCode Field

The TypeCode field partially describes the specific type of the given directory entry. This field, plus the TypeImportance and TypeCategory fields uniquely identify the type of the given directory entry.

All possible values of this field are valid, unless the TypeImportance and TypeCategory fields both contain the value 0; in that case, the value 0 is invalid for this field.

TypeImportance Field

The TypeImportance field describes the importance of the given directory entry.

The valid values for this field are:
   0, which means the given directory entry is critical
   1, which means the given directory entry is benign TypeCategory Field The TypeCategory field describes the category of the given directory entry.

The valid values for this field are:
   0, which means the given directory entry is primary
   1, which means the given directory entry is secondary InUse Field The InUse field describes whether the given directory entry in use or not.

The valid values for this field are:
   0, which means the given directory entry is not in use; this means the given structure actually is an unused directory entry
   1, which means the given directory entry is in use; this means the given structure is a regular directory entry FirstCluster Field The FirstCluster field contains the index of the first cluster of an allocation in the Cluster Heap associated with the given directory entry.

The valid range of values for this field is:

Exactly 0, which means no cluster allocation exists

Between 2 and ClusterCount+1, which is the range of valid cluster indices

Structures which derive from this template may redefine both the FirstCluster and DataLength fields, if a cluster allocation is not compatible with the derivative structure.

DataLength Field

The DataLength field describes the size, in bytes, of the data the associated cluster allocation contains.

The valid range of value for this field is:

At least 0

At most ClusterCount*$2^{SectorsPerClusterShift}$*$2^{BytesPerSectorShift}$

Structures which derive from this template may redefine both the FirstCluster and DataLength fields, if a cluster allocation is not possible for the derivative structure.

Generic Primary DirectoryEntry Template

The first directory entry in a directory entry set is a primary directory entry. All subsequent directory entries, if any, in the directory entry set are secondary directory entries.

The ability to interpret the Generic Primary DirectoryEntry template is mandatory.

All primary directory entry structures derive from the Generic Primary DirectoryEntry template (see Table 14), which derives from the Generic DirectoryEntry template.

TABLE 14

Generic Primary DirectoryEntry Template

| Field Name | Offset (byte) | Size (byte) | Comments |
|---|---|---|---|
| EntryType | 0 | 1 | This field is mandatory. |
| SecondaryCount | 1 | 1 | This field is mandatory. |
| SetChecksum | 2 | 2 | This field is mandatory. |
| GeneralPrimaryFlags | 4 | 2 | This field is mandatory. |
| CustomDefined | 6 | 14 | This field is mandatory and structures which derive from this template define its contents. |
| FirstCluster | 20 | 4 | This field is mandatory. |
| DataLength | 24 | 8 | This field is mandatory. |

EntryType Field

The EntryType field conforms to the definition the Generic DirectoryEntry template provides.

TypeCode Field

The TypeCode field conforms to the definition the Generic DirectoryEntry template provides.

TypeImportance Field

The TypeImportance field conforms to the definition the Generic DirectoryEntry template provides.

Critical Primary Directory Entries

Critical primary directory entries contain information which is critical to the proper management of an exFAT volume. Only the root directory contains critical primary directory entries (File directory entries are an exception).

The definition of critical primary directory entries correlates to the major exFAT revision number.

Benign Primary Directory Entries

Support for any benign primary directory entry this appendix defines is optional. An unrecognized benign primary directory entry renders the entire directory entry set as unrecognized (beyond the definition of the applicable directory entry templates).

TypeCategory Field

The TypeCategory field conforms to the definition the Generic DirectoryEntry template provides.

For this template, the valid value for this field is 0.

InUse Field

The InUse field conforms to the definition the Generic DirectoryEntry template provides.

SecondaryCount Field

The SecondaryCount field describes the number of secondary directory entries which immediately follow the given primary directory entry. These secondary directory entries, along with the given primary directory entry, comprise the directory entry set.

The valid range of values for this field is:

At least 0, which means this primary directory entry is the only entry in the directory entry set At most 255, which means the next 255 directory entries and this primary directory entry comprise the directory entry set Critical primary directory entry structures which derive from this template may redefine both the SecondaryCount and SetChecksum fields.

SetChecksum Field

The SetChecksum field contains the checksum of all directory entries in the given directory entry set. However, the checksum excludes this field (see FIG. 1).

Critical primary directory entry structures which derive from this template may redefine both the SecondaryCount and SetChecksum fields.

FIG. 1 EntrySetChecksum Computation

```
UInt16 EntrySetChecksum
(
    UCHAR *  Entries,   // points to an in-memory copy of the
directory entry set
    UCHAR SecondaryCount
)
{
    UInt16 NumberOfBytes =    ((UInt16)SecondaryCount + 1) * 32;
    UInt16 Checksum =         0;
    UInt16 Index;
    for (Index = 0; Index < NumberOfBytes; Index++)
    {
        if ((Index == 2) || (Index == 3))
        {
                continue;
        }
        Checksum = ((Checksum&1) ? 0x8000 : 0) +
(Checksum>>1) + (UInt16)Entries[Index];
    }
    return Checksum;
}
```

GeneralPrimaryFlags Field

The GeneralPrimaryFlags field contains flags (see Table 15).

Critical primary directory entry structures which derive from this template may redefine this field.

TABLE 15

Generic GeneralPrimaryFlags Field Structure

| Field Name | Offset (bit) | Size (bits) | Comments |
|---|---|---|---|
| AllocationPossible | 0 | 1 | This field is mandatory. |
| NoFatChain | 1 | 1 | This field is mandatory. |
| CustomDefined | 2 | 14 | This field is mandatory and structures which derive from this template may define this field. |

AllocationPossible Field

The AllocationPossible field describes whether or not an allocation in the Cluster Heap is possible for the given directory entry.

The valid values for this field are:

0, which means an associated allocation of clusters is not possible and the FirstCluster and DataLength fields are actually undefined (structures which derive from this template may redefine those fields)

1, which means an associated allocation of clusters is possible and the FirstCluster and DataLength fields are as defined NoFatChain Field The NoFatChain field indicates whether or not the active FAT describes the given allocation's cluster chain.

The valid values for this field are:

0, which means the corresponding FAT entries for the allocation's cluster chain are valid; if the AllocationPossible field contains the value 0, then 0 is this field's only valid value 1, which means the associated allocation is one contiguous series of clusters; the corresponding FAT entries for the clusters are invalid If critical primary directory entry structures which derive from this template redefine the GeneralPrimaryFlags field, then the corresponding FAT entries for any associated allocation's cluster chain are valid.

FirstCluster Field

The FirstCluster field conforms to the definition the Generic DirectoryEntry template provides.

Critical primary directory entry structures which derive from this template may redefine the FirstCluster and DataLength fields. Other structures which derive from this template may redefine the FirstCluster and DataLength fields only if the AllocationPossible field contains the value 0.

DataLength Field

The DataCluster field conforms to the definition the Generic DirectoryEntry template provides.

Critical primary directory entry structures which derive from this template may redefine the FirstCluster and DataLength fields. Other structures which derive from this template may redefine the FirstCluster and DataLength fields only if the AllocationPossible field contains the value 0.

Generic Secondary DirectoryEntry Template

The ability to interpret the Generic Secondary DirectoryEntry template is mandatory. Support for any critical or benign secondary directory entry this appendix defines is optional.

All secondary directory entry structures derive from the Generic Secondary DirectoryEntry template (see Table 16), which derives from the Generic DirectoryEntry template.

TABLE 16

Generic Secondary DirectoryEntry Template

| Field Name | Offset (byte) | Size (byte) | Comments |
|---|---|---|---|
| EntryType | 0 | 1 | This field is mandatory. |
| GeneralSecondaryFlags | 1 | 1 | This field is mandatory. |
| CustomDefined | 2 | 18 | This field is mandatory and structures which derive from this template define its contents. |
| FirstCluster | 20 | 4 | This field is mandatory. |
| DataLength | 24 | 8 | This field is mandatory. |

EntryType Field

The EntryType field conforms to the definition the Generic DirectoryEntry template provides TypeCode Field The TypeCode field conforms to the definition the Generic DirectoryEntry template provides.

TypeImportance Field

The TypeImportance field conforms to the definition the Generic DirectoryEntry template provides.

Critical Secondary Directory Entries

Critical secondary directory entries contain information which is critical to the proper management of its containing directory entry set. An unrecognized critical directory entry renders the entire directory entry set as unrecognized (beyond the definition of the applicable directory entry templates).

Benign Secondary Directory Entries

Benign secondary directory entries contain additional information which may be useful for managing its containing directory entry set. Support for any specific benign secondary directory entry is optional. Unrecognized benign secondary directory entries do not render the entire directory entry set as unrecognized.

TypeCategory Field

The TypeCategory field conforms to the definition the Generic DirectoryEntry template provides.

For this template, the valid value for this field is 1.

InUse Field

The InUse field conforms to the definition the Generic DirectoryEntry template provides.

GeneralSecondaryFlags Field

The GeneralSecondaryFlags field contains flags (see Table 17).

TABLE 17

Generic GeneralSecondaryFlags Field Structure

| Field Name | Offset (bit) | Size (bits) | Comments |
|---|---|---|---|
| AllocationPossible | 0 | 1 | This field is mandatory. |
| NoFatChain | 1 | 1 | This field is mandatory. |
| CustomDefined | 2 | 14 | This field is mandatory and structures which derive from this template may define this field. |

AllocationPossible Field

The AllocationPossible field has the same definition as the similarly-named field in the Generic Primary DirectoryEntry template.

NoFatChain Field

The NoFatChain field has the same definition as a similarly-named field in the Generic Primary DirectoryEntry template.

FirstCluster Field

The FirstCluster field conforms to the definition the Generic DirectoryEntry template provides.

DataLength Field

The DataCluster field conforms to the definition the Generic DirectoryEntry template provides.

Directory Entry Definitions

This appendix defines the following directory entries:
Critical primary
    Allocation Bitmap
    Up-case Table
    Volume Label
    File
Benign primary
    Volume GUID
    TexFAT Padding
    Windows CE Access Control Table
Critical secondary
    Stream Extension
    File Name
    Windows CE Access Control Allocation Bitmap Directory Entry In the exFAT file system, a FAT does not describe allocation state of clusters; rather, an Allocation Bitmap does. Allocation Bitmaps exist in the Cluster Heap and have corresponding critical primary directory entries in the root directory (see Table 18).

The NumberOfFats field determines the number of valid Allocation Bitmap directory entries in the root directory. If the NumberOfFats field contains the value 1, then the only valid number of Allocation Bitmap directory entries is 1. Further, the one Allocation Bitmap directory entry is only valid if it describes the First Allocation Bitmap. If the NumberOfFats field contains the value 2, then the only valid number of Allocation Bitmap directory entries is 2. Further, the two Allocation Bitmap directory entries are only valid if one describes the First Allocation Bitmap and the other describes the Second Allocation Bitmap.

TABLE 18

Allocation Bitmap DirectoryEntry Structure

| Field Name | Offset (byte) | Size (byte) | Comments |
| --- | --- | --- | --- |
| EntryType | 0 | 1 | This field is mandatory. |
| BitmapFlags | 1 | 1 | This field is mandatory. |
| Reserved | 2 | 18 | This field is mandatory. |
| FirstCluster | 20 | 4 | This field is mandatory. |
| DataLength | 24 | 8 | This field is mandatory. |

EntryType Field

The EntryType field conforms to the definition the Generic Primary DirectoryEntry template provides.

TypeCode Field

The TypeCode field conforms to the definition the Generic Primary DirectoryEntry template provides.

For an Allocation Bitmap directory entry, the valid value for this field is 1.

TypeImportance Field

The TypeImportance field conforms to the definition the Generic Primary DirectoryEntry template provides.

For an Allocation Bitmap directory entry, the valid value for this field is 0.

TypeCategory Field

The TypeCategory field conforms to the definition the Generic Primary DirectoryEntry template provides.

InUse Field

The InUse field conforms to the definition the Generic Primary DirectoryEntry template provides.

BitmapFlags Field

The BitmapFlags field contains flags (see Table 19).

TABLE 19

BitmapFlags Field Structure

| Field Name | Offset (bit) | Size (bits) | Comments |
| --- | --- | --- | --- |
| BitmapIdentifier | 0 | 1 | This field is mandatory. |
| Reserved | 1 | 7 | This field is mandatory. |

BitmapIdentifier Field

The BitmapIdentifier field indicates which Allocation Bitmap the given directory entry describes. Implementations shall use the First Allocation Bitmap in conjunction with the First FAT and shall use the Second Allocation Bitmap in conjunction with the Second FAT. The ActiveFat field describes which FAT and Allocation Bitmap are active.

The valid values for this field are:
0, which means the given directory entry describes the First Allocation Bitmap
1, which means the given directory entry describes the Second Allocation Bitmap and is possible only when NumberOfFats contains the value 2

FirstCluster Field

The FirstCluster field conforms to the definition the Generic Primary DirectoryEntry template provides.

This field contains the index of the first cluster of the cluster chain, as the FAT describes, which hosts the Allocation Bitmap.

DataLength Field

The DataCluster field conforms to the definition the Generic Primary DirectoryEntry template provides.

Allocation Bitmap

An Allocation Bitmap records the allocation state of the clusters in the Cluster Heap. Each bit in an Allocation Bitmap indicates whether its corresponding cluster is available for allocation or not.

An Allocation Bitmap represents clusters from lowest to highest index (see Table 20). For historical reasons, the first cluster has index 2. Note: the first bit in the bitmap is the lowest-order bit of the first byte.

TABLE 20

Allocation Bitmap Structure

| Field Name | Offset (bit) | Size (bits) | Comments |
| --- | --- | --- | --- |
| BitmapEntry[2] | 0 | 1 | This field is mandatory. |
| . | . | . | . |
| . | . | . | . |
| . | . | . | . |

TABLE 20-continued

Allocation Bitmap Structure

| Field Name | Offset (bit) | Size (bits) | Comments |
|---|---|---|---|
| BitmapEntry-[ClusterCount + 1] | ClusterCount − 1 | 1 | This field is mandatory. Note: the Main and Backup Boot Sectors both contain the ClusterCount field. |
| Reserved | ClusterCount | (DataLength * 8) − ClusterCount | This field is mandatory and its contents, if any, are reserved. Note: the Main and Backup Boot Sectors both contain the ClusterCount field. |

BitmapEntry[2] . . . BitmapEntry[ClusterCount+1] Fields

Each BitmapEntry field in this array represents a cluster in the Cluster Heap. BitmapEntry[2] represents the first cluster in the Cluster Heap and BitmapEntry[ClusterCount+1] represents the last cluster in the Cluster Heap.

The valid values for these fields are:

0, which describes the corresponding cluster as available for allocation 1, which describes the corresponding cluster as not available for allocation (a cluster allocation may already consume the corresponding cluster or the active FAT may describe the corresponding cluster as bad)

Up-Case Table Directory Entry

The Up-case Table defines the conversion from lower-case to upper-case characters. This is important due to the File Name directory entry using Unicode characters and the exFAT file system being case insensitive and case preserving. The Up-case Table exists in the Cluster Heap and has a corresponding critical primary directory entry in the root directory (see Table 21). The valid number of Up-case Table directory entries is 1.

TABLE 21

Up-case Table DirectoryEntry Structure

| Field Name | Offset (byte) | Size (byte) | Comments |
|---|---|---|---|
| EntryType | 0 | 1 | This field is mandatory. |
| Reserved1 | 1 | 3 | This field is mandatory and its contents are reserved. |
| TableChecksum | 4 | 4 | This field is mandatory. |
| Reserved2 | 8 | 12 | This field is mandatory. |
| FirstCluster | 20 | 4 | This field is mandatory. |
| DataLength | 24 | 8 | This field is mandatory. |

EntryType Field

The EntryType field conforms to the definition the Generic Primary DirectoryEntry template provides.

TypeCode Field

The TypeCode field conforms to the definition the Generic Primary DirectoryEntry template provides.

For the Up-case Table directory entry, the valid value for this field is 2.

TypeImportance Field

The TypeImportance field conforms to the definition the Generic Primary DirectoryEntry template provides.

For the Up-case Table directory entry, the valid value for this field is 0.

TypeCategory Field

The TypeCategory field conforms to the definition the Generic Primary DirectoryEntry template provides.

InUse Field

The InUse field conforms to the definition the Generic Primary DirectoryEntry template provides.

TableChecksum Field

The TableChecksum field contains the checksum of the Up-case Table (which the FirstCluster and DataLength fields describe). Implementations shall verify the contents of this field are valid prior to using the Up-case Table.

FIG. 2 TableChecksum Computation

```
UInt32 TableChecksum
(
    UCHAR *     Table,      // points to an in-memory copy of the
up-case table
    UInt64 DataLength
)
{
    UInt32 Checksum = 0;
    UInt64 Index;
    for (Index = 0; Index < DataLength; Index++)
    {
        Checksum = ((Checksum&1) ? 0x80000000 : 0) +
(Checksum>>1) + (UInt32)Table[Index];
    }
    return Checksum;
}
```

FirstCluster Field

The FirstCluster field conforms to the definition the Generic Primary DirectoryEntry template provides.

This field contains the index of the first cluster of the cluster chain, as the FAT describes, which hosts the Up-case Table.

DataLength Field

The DataCluster field conforms to the definition the Generic Primary DirectoryEntry template provides.

Up-Case Table

The Up-case Table is a series of Unicode character mappings. A character mapping consists of a 2-byte field, with the index of the field in the Up-case Table representing the Unicode character to be up-cased, and the 2-byte field representing the up-cased Unicode character.

The first 128 Unicode characters have mandatory mappings (see Table 22). An Up-case invalid.

Implementations which only support characters from the mandatory mapping range may ignore the mappings of the rest of the Up-case Table. Such implementations shall only use characters from the mandatory mapping range when creating or renaming files (via the File Name directory entry). When up-casing existing file names, such implementations shall not up-case characters from the non-mandatory mapping range, but shall leave them intact in the resulting up-cased file name (this is a partial up-casing). When comparing file names, such implementations shall treat file names which differ from the name under comparison only by Unicode characters from the non-mandatory mapping range as equivalent. While such file names are only potentially equivalent, such implementations cannot ensure the fully up-cased file name does not collide with the name under comparison.

TABLE 22

Mandatory First 128 Up-case Table Entries (entries with non-identity mappings are in bold)

| Table Index | +0 | +1 | +2 | +3 | +4 | +5 | +6 | +7 |
|---|---|---|---|---|---|---|---|---|
| 0000h | 0000h | 0001h | 0002h | 0003h | 0004h | 0005h | 0006h | 0007h |
| 0008h | 0008h | 0009h | 000Ah | 000Bh | 000Ch | 000Dh | 000Eh | 000Fh |
| 0010h | 0010h | 0011h | 0012h | 0013h | 0014h | 0015h | 0016h | 0017h |
| 0018h | 0018h | 0019h | 001Ah | 001Bh | 001Ch | 001Dh | 001Eh | 001Fh |
| 0020h | 0020h | 0021h | 0022h | 0023h | 0024h | 0025h | 0026h | 0027h |
| 0028h | 0028h | 0029h | 002Ah | 002Bh | 002Ch | 002Dh | 002Eh | 002Fh |
| 0030h | 0030h | 0031h | 0032h | 0033h | 0034h | 0035h | 0036h | 0037h |
| 0038h | 0038h | 0039h | 003Ah | 003Bh | 003Ch | 003Dh | 003Eh | 003Fh |
| 0040h | 0040h | 0041h | 0042h | 0043h | 0044h | 0045h | 0046h | 0047h |
| 0048h | 0048h | 0049h | 004Ah | 004Bh | 004Ch | 004Dh | 004Eh | 004Fh |
| 0050h | 0050h | 0051h | 0052h | 0053h | 0054h | 0055h | 0056h | 0057h |
| 0058h | 0058h | 0059h | 005Ah | 005Bh | 005Ch | 005Dh | 005Eh | 005Fh |
| 0060h | 0060h | 0041h | 0042h | 0043h | 0044h | 0045h | 0046h | 0047h |
| 0068h | 0048h | 0049h | 004Ah | 004Bh | 004Ch | 004Dh | 004Eh | 004Fh |
| 0070h | 0050h | 0051h | 0052h | 0053h | 0054h | 0055h | 0056h | 0057h |
| 0078h | 0058h | 0059h | 005Ah | 007Bh | 007Ch | 007Dh | 007Eh | 007Fh |

Upon formatting a volume, implementations may generate the Up-case Table in a compressed format using identity-mapping compression, since a large portion of the Unicode character space has no concept of case (which means the "lower-case" and "upper-case" characters are equivalent). Implementations compress the Up-case Table by representing a series of identity mappings with the value FFFFh followed with the number of identity mappings.

For example, an implementation may represent the first 100 (64h) character mappings with the following eight entries of a compressed Up-case Table:

FFFFh, 0061h, 0041h, 0042h, 0043h

The first two entries indicate the first 97 (61h) characters (from 0000h to 0060h) have identity mappings. The subsequent characters, 0061h through 0063h, map to characters 0041h through 0043h, respectively.

The ability to provide a compressed Up-case Table upon formatting a volume is optional. However, the ability to interpret both an uncompressed and a compressed Up-case Table is mandatory.

Due to the relationship between the Up-case Table and file names, implementations shall not modify the Up-case Table on the volume.

Volume Label Directory Entry

The Volume Label is a Unicode string which enables end users to distinguish their storage volumes. In the exFAT file system, the Volume Label exists as a critical primary directory entry in the root directory (see Table 23). The valid number of Volume Label directory entries ranges from 0 to 1.

TABLE 23

Volume Label DirectoryEntry Structure

| Field Name | Offset (byte) | Size (byte) | Comments |
|---|---|---|---|
| EntryType | 0 | 1 | This field is mandatory. |
| CharacterCount | 1 | 1 | This field is mandatory. |
| VolumeLabel | 2 | 22 | This field is mandatory. |
| Reserved | 24 | 8 | This field is mandatory and its contents are reserved. |

EntryType Field

The EntryType field conforms to the definition the Generic Primary DirectoryEntry template provides.

TypeCode Field

The TypeCode field conforms to the definition the Generic Primary DirectoryEntry template provides.

For the Volume Label directory entry, the valid value for this field is 3.

TypeImportance Field

The TypeImportance field conforms to the definition the Generic Primary DirectoryEntry template provides.

For the Volume Label directory entry, the valid value for this field is 0.

TypeCategory Field

The TypeCategory field conforms to the definition the Generic Primary DirectoryEntry template provides.

InUse Field

The InUse field conforms to the definition the Generic Primary DirectoryEntry template provides.

CharacterCount Field

The CharacterCount field contains the length of the Unicode string the VolumeLabel field contains.

The valid range of values for this field is:

At least 0, which means the Unicode string is 0 characters long (which is the equivalent of no volume label)

At most 11, which means the Unicode string is 11 characters long

VolumeLabel Field

The VolumeLabel field contains a Unicode string, which is the user-friendly name of the volume. The VolumeLabel field has the same set of invalid characters as the FileName field of the File Name directory entry.

File Directory Entry

File directory entries describe files and directories. They are critical primary directory entries and any directory may contain zero or more File directory entries (see Table 24). For a File directory entry to be valid, at most one Stream Extension directory entry and at least one File Name directory entry immediately follow the File directory entry.

TABLE 24

File DirectoryEntry

| Field Name | Offset (byte) | Size (byte) | Comments |
|---|---|---|---|
| EntryType | 0 | 1 | This field is mandatory. |
| SecondaryCount | 1 | 1 | This field is mandatory. |
| SetChecksum | 2 | 2 | This field is mandatory. |
| FileAttributes | 4 | 2 | This field is mandatory. |
| Reserved1 | 6 | 2 | This field is mandatory. |
| CreateTimestamp | 8 | 4 | This field is mandatory. |
| LastModifiedTimestamp | 12 | 4 | This field is mandatory. |
| LastAccessedTimestamp | 16 | 4 | This field is mandatory. |
| Create10msIncrement | 20 | 1 | This field is mandatory. |
| LastModified10msIncrement | 21 | 1 | This field is mandatory. |
| LastAccessed10msIncrement | 22 | 1 | This field is mandatory. |
| Reserved2 | 23 | 9 | This field is mandatory and its contents are reserved. |

EntryType Field

The EntryType field conforms to the definition the Generic Primary DirectoryEntry template provides.

TypeCode Field

The TypeCode field conforms to the definition the Generic Primary DirectoryEntry template provides.

For a File directory entry, the valid value for this field is 5.

TypeImportance Field

The TypeImportance field conforms to the definition the Generic Primary DirectoryEntry template provides.

For a File directory entry, the valid value for this field is 0.

TypeCategory Field

The TypeCategory field conforms to the definition the Generic Primary DirectoryEntry template provides.

InUse Field

The InUse field conforms to the definition the Generic Primary DirectoryEntry template provides.

SecondaryCount Field

The SecondaryCount field conforms to the definition the Generic Primary DirectoryEntry template provides.

SetChecksum Field

The SetChecksum field conforms to the definition the Generic Primary DirectoryEntry template provides.

FileAttributes Field

The FileAttributes field contains flags (see Table 25).

TABLE 25

FileAttributes Field Structure

| Field Name | Offset (bit) | Size (bits) | Comments |
|---|---|---|---|
| ReadOnly | 0 | 1 | This field is mandatory and conforms to the MS-DOS definition. |
| Hidden | 1 | 1 | This field is mandatory and conforms to the MS-DOS definition. |
| System | 2 | 1 | This field is mandatory and conforms to the MS-DOS definition. |
| Reserved1 | 3 | 1 | This field is mandatory and its contents are reserved. |
| Directory | 4 | 1 | This field is mandatory and conforms to the MS-DOS definition. |
| Archive | 5 | 1 | This field is mandatory and conforms to the MS-DOS definition. |
| Reserved2 | 6 | 10 | This field is mandatory and its contents are reserved. |

CreateTimestamp and Create10msIncrement Fields

In combination, the CreateTimestamp and CreateTime10msIncrement fields describe the date and time the given file/directory was created.

These two fields conform to the definitions of the Timestamp and 10msIncrement fields.

LastModifiedTimestamp and LastModified10msIncrement Fields

In combination, the LastModifiedTimestamp and LastModifiedTime10msIncrement fields describe the date and time any of the cluster allocations associated with the given directory entry set was last modified.

These two fields conform to the definitions of the Timestamp and 10msIncrement fields.

LastAccessedTimestamp and LastAccessed10msIncrement Fields

In combination, the LastAccessedTimestamp and LastAccessedTime10msIncrement fields describe the date and time any of the cluster allocations associated with the given directory entry set was last accessed (which includes read operations).

These two fields conform to the definitions of the Timestamp and 10msIncrement fields.

Timestamp Fields

Timestamp fields describe both local date and time, down to a two-second resolution (see Table 26).

TABLE 26

Timestamp Field Structure

| Field Name | Offset (bit) | Size (bits) | Comments |
|---|---|---|---|
| DoubleSeconds | 0 | 5 | This field is mandatory. |
| Minute | 5 | 6 | This field is mandatory. |

TABLE 26-continued

Timestamp Field Structure

| Field Name | Offset (bit) | Size (bits) | Comments |
|---|---|---|---|
| Hour | 11 | 5 | This field is mandatory. |
| Day | 16 | 5 | This field is mandatory. |
| Month | 21 | 4 | This field is mandatory. |
| Year | 25 | 7 | This field is mandatory. |

DoubleSeconds Field

The DoubleSeconds field describes the seconds portion of the Timestamp field, in two-second multiples.

The valid range of values for this field is:

0, which represents 0 seconds 29, which represents 58 seconds

Minute Field

The Minute field describes the minutes portion of the Timestamp field.

The valid range of values for this field is:

0, which represents 0 minutes 59, which represents 59 minutes

Hour Field

The Hour field describes the hours portion of the Timestamp field.

The valid range of values for this field is:

0, which represents 00:00 hours 23, which represents 23:00 hours

Day Field

The Day field describes the day portion of the Timestamp field.

The valid range of values for this field is:

1, which is the first day of the given month

The last day of the given month (the given month defines the number of valid days)

Month Field

The Month field describes the month portion of the Timestamp field.

The valid range of values for this field is:

At least 1, which represents January

At most 12, which represents December

Year Field

The Year field describes the year portion of the Timestamp field, relative to the year 1980. This field represents the year 1980 with the value 0 and the year 2107 with the value 127.

All possible values for this field are valid.

10msIncrement Fields

10msIncrement fields provide additional time resolution to their corresponding Timestamp fields in ten-millisecond multiples.

The valid range of values for these fields is:

At least 0, which represents 0 milliseconds

At most 199, which represents 1990 milliseconds

Volume Guid Directory Entry

The Volume GUID directory entry contains a GUID which enables implementations to uniquely and programmatically distinguish volumes. The Volume GUID exists as a benign primary directory entry in the root directory (see Table 27). The valid number of Volume GUID directory entries ranges from 0 to 1.

TABLE 27

Volume GUID DirectoryEntry

| Field Name | Offset (byte) | Size (byte) | Comments |
|---|---|---|---|
| EntryType | 0 | 1 | This field is mandatory. |
| SecondaryCount | 1 | 1 | This field is mandatory. |
| SetChecksum | 2 | 2 | This field is mandatory. |
| GeneralPrimaryFlags | 4 | 2 | This field is mandatory. |
| VolumeGuid | 6 | 16 | This field is mandatory. |
| Reserved | 22 | 10 | This field is mandatory and its contents are reserved. |

EntryType Field

The EntryType field conforms to the definition the Generic Primary DirectoryEntry template provides.

TypeCode Field

The TypeCode field conforms to the definition the Generic Primary DirectoryEntry template provides.

For the Volume GUID directory entry, the valid value for this field is 0.

TypeImportance Field

The TypeImportance field conforms to the definition the Generic Primary DirectoryEntry template provides.

For the Volume GUID directory entry, the valid value for this field is 1.

TypeCategory Field

The TypeCategory field conforms to the definition the Generic Primary DirectoryEntry template provides.

InUse Field

The InUse field conforms to the definition the Generic Primary DirectoryEntry template provides.

SecondaryCount Field

The SecondaryCount field conforms to the definition the Generic Primary DirectoryEntry template provides.

For the Volume GUID directory entry, the valid value for this field is 0.

SetChecksum Field

The SetChecksum field conforms to the definition the Generic Primary DirectoryEntry template provides.

GeneralPrimaryFlags Field

The GeneralPrimaryFlags field conforms to the definition the Generic Primary DirectoryEntry template provides and defines the contents of the CustomDefined field to be reserved.

AllocationPossible Field

The AllocationPossible field conforms to the definition the Generic Primary DirectoryEntry template provides.

For the Volume GUID directory entry, the valid value for this field is 0.

NoFatChain Field

The NoFatChain field conforms to the definition the Generic Primary DirectoryEntry template provides.

VolumeGuid Field

The VolumeGuid field contains a GUID which uniquely identifies the given volume.

All possible values for this field are valid, except the null GUID, which is {00000000-0000-0000-0000-000000000000}.

TexFAT Padding Directory Entry

TexFAT Padding directory entries are useful in the context of TexFAT semantics. They are benign primary directory entries and are only valid in the first cluster of a directory and occupy every directory entry in the cluster.

This appendix, exFAT Revision 1.00 File System Basic Appendix, does not define the TexFAT Padding directory entry. However, its type code is 1 and its type importance is 1.

Implementations of this appendix shall treat TexFAT Padding directory entries the same as any other unrecognized benign primary directory entries, except implementations shall not move TexFAT Padding directory entries.

Windows CE Access Control Table Directory Entry

The Windows CE Access Control Table directory entry is useful in the context of Windows CE applications. It exists as a benign primary directory entry in the root directory. The valid number of Windows CE Access Control Table directory entries ranges from 0 to 1.

This appendix, exFAT Revision 1.00 File System Basic Appendix, does not define the Windows CE Access Control Table directory entry. However, its type code is 2 and its type importance is 1. Implementations of this appendix shall treat the Windows CE Access Control Table directory entry the same as any other unrecognized benign primary directory entry.

Stream Extension Directory Entry

The Stream Extension directory entry is a critical secondary directory entry in File directory entry sets (see Table 28). The valid number of Stream Extension directory entries in a File directory entry set is 1. Further, this directory entry is valid only if it immediately follows the File directory entry.

TABLE 28

Stream Extension DirectoryEntry

| Field Name | Offset (byte) | Size (byte) | Comments |
|---|---|---|---|
| EntryType | 0 | 1 | This field is mandatory. |
| GeneralSecondaryFlags | 1 | 1 | This field is mandatory. |
| Reserved1 | 2 | 1 | This field is mandatory and its contents are reserved. |
| NameLength | 3 | 1 | This field is mandatory. |
| NameHash | 4 | 2 | This field is mandatory. |
| Reserved2 | 6 | 2 | This field is mandatory and its contents are reserved. |
| ValidDataLength | 8 | 8 | This field is mandatory. |
| Reserved3 | 16 | 4 | This field is mandatory and its contents are reserved. |
| FirstCluster | 20 | 4 | This field is mandatory. |
| DataLength | 24 | 8 | This field is mandatory. |

EntryType Field

The EntryType field conforms to the definition the Generic Secondary DirectoryEntry template provides.

TypeCode Field

The TypeCode field conforms to the definition the Generic Secondary DirectoryEntry template provides.

For the Stream Extension directory entry, the valid value for this field is 0.

TypeImportance Field

The TypeImportance field conforms to the definition the Generic Secondary DirectoryEntry template provides.

For the Stream Extension directory entry, the valid value for this field is 0.

TypeCategory Field

The TypeCategory field conforms to the definition the Generic Secondary DirectoryEntry template provides.

InUse Field

The InUse field conforms to the definition the Generic Secondary DirectoryEntry template provides.

GeneralSecondaryFlags Field

The GeneralSecondaryFlags field conforms to the definition the Generic Secondary DirectoryEntry template provides and defines the contents of the CustomDefined field to be reserved.

AllocationPossible Field

The AllocationPossible field conforms to the definition the Generic Secondary DirectoryEntry template provides.

For the Stream Extension directory entry, the valid value for this field is 1.

NoFatChain Field

The NoFatChain field conforms to the definition the Generic Secondary DirectoryEntry template provides.

NameLength Field

The NameLength field contains the length of the Unicode string the subsequent File Name directory entries collectively contain.

All possible values of this field are valid.

NameHash Field

The NameHash field contains a 2-byte hash (see FIG. 3) of the up-cased file name. This enables implementations to perform a quick comparison when searching for a file by name. Importantly, the NameHash provides a sure verification of a mismatch. Implementations shall verify all NameHash matches with a comparison of the up-cased file name.

```
                    FIG. 3 NameHash Computation

UInt16 NameHash
    (
        WCHAR *    FileName,        // points to an in-memory
    copy of the up-cased file name
        UCHAR NameLength
    )
    {
        UCHAR *    Buffer =         (UCHAR *)FileName;
        UInt16 NumberOfBytes =      (UInt16)NameLength * 2;
        UInt16 Hash =               0;
        UInt16 Index;
        for (Index = 0; Index < NumberOfBytes; Index++)
        {
            Hash = ((Hash&1) ? 0x8000 : 0) + (Hash>>1) +
    (UInt16)Buffer[Index];
        }
        return Hash;
    }
```

ValidDataLength Field

The ValidDataLength field describes how far into the data stream user data has been written. Implementations shall update this field as they write data further out into the data stream. On the storage media, the data between the valid data length and the data length of the data stream is undefined. Implementations shall return zeroes for read operations beyond the valid data length.

If the corresponding File directory entry describes a directory, then the only valid value for this field is equal to the value of the DataLength field. Otherwise, the range of valid values for this field is:

At least 0, which means no user data has been written out to the data stream

At most DataLength, which means user data has been written out to the entire length of the data stream FirstCluster Field The FirstCluster field conforms to the definition the Generic Secondary DirectoryEntry template provides.

This field contains the index of the first cluster of the data stream, which hosts the user data.

DataLength Field

The DataLength field conforms to the definition the Generic Secondary DirectoryEntry template provides.

If the corresponding File directory entry describes a directory, then the valid value for this field is the entire size of the associated allocation, in bytes, which may be 0. Further, for directories, the maximum value for this field is 256 MB.

File Name Directory Entry

File Name directory entries are critical secondary directory entries in File directory entry sets (see Table 29). The valid number of File Name directory entries in a File directory entry set is NameLength/15, rounded up to the nearest integer. Further, File Name directory entries are valid only if they immediately follow the Stream Extension directory entry as a consecutive series. File Name directory entries combine to form the file name for the File directory entry set.

TABLE 29

File Name DirectoryEntry

| Field Name | Offset (byte) | Size (byte) | Comments |
|---|---|---|---|
| EntryType | 0 | 1 | This field is mandatory. |
| GeneralSecondaryFlags | 1 | 1 | This field is mandatory. |
| FileName | 2 | 30 | This field is mandatory. |

EntryType Field

The EntryType field conforms to the definition the Generic Secondary DirectoryEntry template provides.

TypeCode Field

The TypeCode field conforms to the definition the Generic Secondary DirectoryEntry template provides.

For the Stream Extension directory entry, the valid value for this field is 1.

TypeImportance Field

The TypeImportance field conforms to the definition the Generic Secondary DirectoryEntry template provides.

For the Stream Extension directory entry, the valid value for this field is 0.

TypeCategory Field

The TypeCategory field conforms to the definition the Generic Secondary DirectoryEntry template provides.

InUse Field

The InUse field conforms to the definition the Generic Secondary DirectoryEntry template provides.

GeneralSecondaryFlags Field

The GeneralSecondaryFlags field conforms to the definition the Generic Secondary DirectoryEntry template provides and defines the contents of the CustomDefined field to be reserved.

AllocationPossible Field

The AllocationPossible field conforms to the definition the Generic Secondary DirectoryEntry template provides.

For the Stream Extension directory entry, the valid value for this field is 0.

NoFatChain Field

The NoFatChain field conforms to the definition the Generic Secondary DirectoryEntry template provides.

FileName Field

The FileName field contains a Unicode string, which is a portion of the file name. In the order File Name directory entries exist in a File directory entry set, FileName fields concatenate to form the file name for the File directory entry set. Given the length of the FileName field, 15 characters, and the maximum number of File Name directory entries, 17, the maximum length of the final, concatenated file name is 255.

The concatenated file name has the same set of illegal characters as other FAT-based file systems (see Table 30). Implementations should set the unused characters of FileName fields to the value 0000h.

TABLE 30

Invalid FileName Characters

| Character Code | Description | Character Code | Description | Character Code | Description |
|---|---|---|---|---|---|
| 0000h | Control code | 0001h | Control code | 0002h | Control code |
| 0003h | Control code | 0004h | Control code | 0005h | Control code |
| 0006h | Control code | 0007h | Control code | 0008h | Control code |
| 0009h | Control code | 000Ah | Control code | 000Bh | Control code |
| 000Ch | Control code | 000Dh | Control code | 000Eh | Control code |
| 000Fh | Control code | 0010h | Control code | 0011h | Control code |
| 0012h | Control code | 0013h | Control code | 0014h | Control code |
| 0015h | Control code | 0016h | Control code | 0017h | Control code |
| 0018h | Control code | 0019h | Control code | 001Ah | Control code |
| 001Bh | Control code | 001Ch | Control code | 001Dh | Control code |
| 001Eh | Control code | 001Fh | Control code | 0022h | Quotation mark |
| 002Ah | Asterisk | 002Fh | Forward slash | 003Ah | Colon |
| 003Ch | Less-than sign | 003Eh | Greater-than sign | 003Fh | Question mark |
| 005Ch | Back slash | 007Ch | Vertical bar | | |

The file names "." and ".." have the special meaning of "this directory" and "containing directory", respectively. Implementations shall not record either file name in the FileName field. However, implementations may generate these two file names in directory listings to refer to the directory being listed and the containing directory.

What is claimed is:

1. A first one or more computer readable storage media having computer executable instructions that, when executed on at least one processor, configure the at least one processor to perform a method of detecting if a target file name exists on a second one or more computer readable storage media, the method comprising:

(A) determining a name hash from the target name;

(B) determining if the name hash corresponds to a directory entry set name hash value, the directory entry set name hash value corresponding to one of a plurality of directory entry sets, each of the plurality of directory entry sets stored on the second one or more computer readable storage media;

(C) determining if the target name matches a directory entry set name corresponding to the one of the plurality of directory entry sets after step (B) determines the name hash corresponds to the directory entry set name hash value; and (D) indicating that the target name exists after step (C) determines the target name matches the directory entry set name, the step (A) comprising:
determining the target name corresponds to one of a predetermined set of names, the predetermined set of names having a common portion;
initializing a temporary value to a predetermined start value, the predetermined start value corresponding to a pre-computed partial hash value corresponding to the common portion;
for each character of the target name other than the common portion:
rotating the temporary value right by at least one bit;
converting the character from a first value to a second value based upon a conversion table; and
adding the second value to the temporary value; and
using the temporary value as the name hash.

2. The first one or more computer readable storage media of claim 1, the step (B) comprising:
reading the directory entry set name hash value from the second one or more computer readable storage media; and
comparing the name hash to the directory entry set name hash value.

3. The first one or more computer readable storage media of claim 1, wherein each of the plurality of directory entry sets correspond to a file on the second one or more computer readable storage media, each of the plurality of directory entry sets includes a first directory entry set name hash value, each directory entry within the plurality of directory entry sets is a common predetermined fixed size, the first directory entry set name hash value determined at least in part from a corresponding file name of each of the plurality of directory entry sets.

4. The first one or more computer readable storage media of claim 1, the method further comprising:
iteratively performing step (B) and step (C) for the plurality of directory entry sets, until step (B) determines the name hash corresponds to the directory entry set name hash value, and step (C) determines the target name matches the name corresponding to the one of a plurality of directory entry sets.

5. A first one or more computer readable storage media having computer executable instructions that, when executed on at least one processor, configure the at least one processor to perform a method of detecting if a target file name exists on a second one or more computer readable storage media, the method comprising:
(A) determining a name hash from the target name;
(B) determining if the name hash corresponds to a directory entry set name hash value, the directory entry set name hash value corresponding to one of a plurality of directory entry sets, each of the plurality of directory entry sets stored on the second one or more computer readable storage media;
(C) determining if the target name matches a directory entry set name corresponding to the one of the plurality of directory entry sets after step (B) determines the name hash corresponds to the directory entry set name hash value; and
(D) indicating that the target name exists after step (C) determines the target name matches the directory entry set name, the step (A) comprising:
initializing a temporary value to a predetermined start value;
for each character of the target name:
rotating the temporary value right by at least one bit;
converting the character from a first value to a second value based upon a conversion table; and
adding the second value to the temporary value; and
using the temporary value as the name hash.

6. The first one or more computer readable storage media of claim 5, the step (B) comprising:
reading the directory entry set name hash value from the second one or more computer readable storage media; and
comparing the name hash to the directory entry set name hash value.

7. The first one or more computer readable storage media of claim 5, wherein each of the plurality of directory entry sets correspond to a file on the second one or more computer readable storage media, each of the plurality of directory entry sets includes a first directory entry set name hash value, each directory entry within the plurality of directory entry sets is a common predetermined fixed size, the first directory entry set name hash value determined at least in part from a corresponding file name of each of the plurality of directory entry sets.

8. The first one or more computer readable storage media of claim 5, wherein the conversion table is stored on at least one of the second one or more computer readable storage media.

9. The first one or more computer readable storage media of claim 5, wherein the conversion table is an Up-Case Table.

10. The first one or more computer readable storage media of claim 5, the conversion table comprising a plurality of contiguous character mapping fields, the value stored in each character mapping field corresponding to an up-cased version of the zero-based index of the character mapping field.

11. The first one or more computer readable storage media of claim 10,
the plurality of contiguous character mapping fields comprising at least 123 contiguous character mapping fields, each character mapping field corresponding to a two-byte Unicode character mapping, wherein:
the first 97 character mappings have a value equal to the zero-based index of the character mapping field in the conversion table, and
the next 26 character mappings have a value equal to the zero-based index of the character mapping field in the conversion table minus 32.

12. The first one or more computer readable storage media of claim 5,
the conversion table comprising a plurality of contiguous character mapping fields, the character mapping fields including an identity mapping compressed format.

13. The first one or more computer readable storage media of claim 12,
the plurality of contiguous character mappings fields comprising at least 28 character mappings fields, each character mapping field being two bytes in length, wherein:
a value of FFFFh in a first character mapping field of the plurality of character mapping fields indicates a next character mapping field is the identity-mapping compressed format, the next character mapping field indicating the number of identity mappings,
a first character mapping field at index zero is FFFFh,
a second character mapping field at index one is 0061h, and
a next twenty-six character mapping fields at indices two through 27 start with a value of 0041 h and increment by one to a final value of 005 Ah.

14. The first one or more computer readable storage media of claim 5, the method further comprising:

iteratively performing step (B) and step (C) for the plurality of directory entry sets, until step (B) determines the name hash corresponds to the directory entry set name hash value, and step (C) determines the target name matches the name corresponding to the one of a plurality of directory entry sets.

15. A first one or more computer readable storage media having computer executable instructions that, when executed on at least one processor, configure the at least one processor to perform a method of detecting if a target file name exists on a second one or more computer readable storage media, the method comprising:
- (A) determining a name hash from the target name;
- (B) determining if the name hash corresponds to a directory entry set name hash value, the directory entry set name hash value corresponding to one of a plurality of directory entry sets, each of the plurality of directory entry sets stored on the second one or more computer readable storage media;
- (C) determining if the target name matches a directory entry set name corresponding to the one of the plurality of directory entry sets after step (B) determines the name hash corresponds to the directory entry set name hash value; and
- (D) indicating that the target name exists after step (C) determines the target name matches the directory entry set name, the step (A) comprising:
- determining the target name corresponds to one of a predetermined set of names, the predetermined set of names having a common prefix;
- determining a second portion corresponding to at least a portion of the target name excluding the common prefix;
- initializing a temporary value to a predetermined start value, the predetermined start value corresponding to the common prefix;
- for each character of the second portion:
  - rotating the temporary value right by at least one bit; and
  - adding the second value to the temporary value; and
- using the temporary value as the name hash.

16. The first one or more computer readable storage media of claim 15, the step (B) comprising:
- reading the directory entry set name hash value from the second one or more computer readable storage media; and
- comparing the name hash to the directory entry set name hash value.

17. The first one or more computer readable storage media of claim 15, wherein each of the plurality of directory entry sets correspond to a file on the second one or more computer readable storage media, each of the plurality of directory entry sets includes a first directory entry set name hash value, each directory entry within the plurality of directory entry sets is a common predetermined fixed size, the first directory entry set name hash value determined at least in part from a corresponding file name of each of the plurality of directory entry sets.

18. The first one or more computer readable storage media of claim 15, the method further comprising:
- iteratively performing step (B) and step (C) for the plurality of directory entry sets, until step (B) determines the name hash corresponds to the directory entry set name hash value, and step (C) determines the target name matches the name corresponding to the one of a plurality of directory entry sets.

* * * * *